US008221532B2

(12) United States Patent
Carruthers et al.

(10) Patent No.: US 8,221,532 B2
(45) Date of Patent: *Jul. 17, 2012

(54) NANOPOROUS ARTICLES AND METHODS OF MAKING SAME

(76) Inventors: J. Donald Carruthers, Fairfield, CT (US); Frank Dimeo, Jr., Falls Church, VA (US); Brian Bobita, Northampton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/984,216

(22) Filed: Jan. 4, 2011

(65) Prior Publication Data

US 2011/0220518 A1 Sep. 15, 2011

Related U.S. Application Data

(63) Continuation of application No. 12/182,880, filed on Jul. 30, 2008, now Pat. No. 7,862,646, which is a continuation-in-part of application No. PCT/US2007/061255, filed on Jan. 29, 2007, and a continuation-in-part of application No. PCT/US2007/061256, filed on Jan. 29, 2007.

(60) Provisional application No. 60/763,258, filed on Jan. 30, 2006.

(51) Int. Cl.
*B01D 53/02* (2006.01)
*B01J 20/20* (2006.01)

(52) U.S. Cl. .......................................... 96/148; 502/416

(58) Field of Classification Search .............. 95/90, 131, 95/132, 116, 903; 96/108, 131, 148, 149; 502/416; 206/0.7

See application file for complete search history.

(56) References Cited

U.S. PATENT DOCUMENTS 2,423,702 A 7/1947 Hart
(Continued)

FOREIGN PATENT DOCUMENTS

EP 1 064 996 A1 1/2001
(Continued)

OTHER PUBLICATIONS

Sing, K. S. W., et al., "Reporting Physisorption Data for Gas/Solid Systems with Special Reference to the Determination of Surface Area . . . ", "Pure Appl. Chem.", 1985, pp. 603-619, vol. 57, No. 4.
(Continued)

*Primary Examiner* — Frank Lawrence, Jr.
(74) *Attorney, Agent, or Firm* — Steven J. Hultquist; Hultquist, PLLC; Rosa Yaghmour

(57) ABSTRACT

An adsorbent having porosity expanded by contact with a first agent effecting such expansion and a pressurized second agent effecting transport of the first agent into the porosity, wherein the adsorbent subsequent to removal of the first and second agents retains expanded porosity. The adsorbent can be made by an associated method in which materials such as water, ethers, alcohols, organic solvent media, or inorganic solvent media can be utilized as the first agent for swelling of the porosity, and helium, argon, krypton, xenon, neon, or other inert gases can be employed as the pressurized second agent for transport of both agents into the porosity of the adsorbent, subsequent to which the agents can be removed to yield an adsorbent of increased capacity for sorbable fluids, e.g., organometallic compounds, hydrides, halides and acid gases. Also described is a nanoporous carbon composite having porosity that is at least partially filled with material imparting to the composite an enhanced character with respect to characteristics selected from the group consisting of hardness, wear-resistance and toughness, as compared with the nanoporous carbon alone.

16 Claims, 13 Drawing Sheets

U.S. PATENT DOCUMENTS

| | | | |
|---|---|---|---|
| 2,556,292 A * | 6/1951 | Neweum | 96/131 |
| 2,970,452 A | 2/1961 | Beckman et al. | |
| 3,025,233 A * | 3/1962 | Figert | 210/502.1 |
| 3,156,100 A | 11/1964 | Haettinger et al. | |
| 3,608,273 A * | 9/1971 | Fabuss et al. | 95/148 |
| 3,839,128 A | 10/1974 | Arai | |
| 4,040,990 A | 8/1977 | Neely | |
| 4,302,224 A | 11/1981 | McCombs et al. | |
| 4,801,308 A | 1/1989 | Keefer | |
| 4,817,686 A | 4/1989 | Hatakeyama et al. | |
| 5,039,651 A | 8/1991 | Kosaka et al. | |
| 5,110,328 A | 5/1992 | Yokota et al. | |
| 5,110,422 A | 5/1992 | Alperine et al. | |
| 5,289,690 A | 3/1994 | Rockenfeller et al. | |
| 5,350,513 A | 9/1994 | Markowitz | |
| 5,485,675 A | 1/1996 | Jones et al. | |
| 5,518,528 A | 5/1996 | Tom et al. | |
| 5,518,620 A | 5/1996 | Eguchi et al. | |
| 5,614,459 A | 3/1997 | Mondragon et al. | |
| 5,704,965 A | 1/1998 | Tom et al. | |
| 5,704,967 A | 1/1998 | Tom et al. | |
| 5,707,424 A | 1/1998 | Tom et al. | |
| 5,750,026 A * | 5/1998 | Gadkaree et al. | 210/502.1 |
| 5,761,910 A | 6/1998 | Tom et al. | |
| 5,827,355 A * | 10/1998 | Wilson et al. | 95/114 |
| 5,837,027 A | 11/1998 | Olander et al. | |
| 5,851,270 A | 12/1998 | Olander | |
| 5,858,067 A | 1/1999 | Mcmanus | |
| 5,876,487 A | 3/1999 | Dahlgren et al. | |
| 5,882,384 A | 3/1999 | Tom et al. | |
| 5,916,245 A | 6/1999 | Tom et al. | |
| 5,917,140 A | 6/1999 | Tom | |
| 5,935,305 A | 8/1999 | Tom et al. | |
| 5,961,697 A | 10/1999 | McManus et al. | |
| 5,980,616 A | 11/1999 | Johnson et al. | |
| 5,985,008 A | 11/1999 | Tom | |
| 5,993,766 A | 11/1999 | Tom et al. | |
| 6,019,823 A | 2/2000 | Tischler et al. | |
| 6,027,547 A | 2/2000 | Tom | |
| 6,089,027 A | 7/2000 | Wang et al. | |
| 6,101,816 A | 8/2000 | Wang et al. | |
| 6,110,257 A | 8/2000 | Tom | |
| 6,125,131 A | 9/2000 | Brandes et al. | |
| 6,132,492 A | 10/2000 | Hultquist et al. | |
| 6,143,058 A | 11/2000 | Dahlgren et al. | |
| 6,197,097 B1 * | 3/2001 | Ertl et al. | 96/143 |
| 6,204,180 B1 | 3/2001 | Tom et al. | |
| 6,309,446 B1 | 10/2001 | Nakanoya et al. | |
| 6,381,983 B1 * | 5/2002 | Angelo et al. | 62/474 |
| 6,406,519 B1 | 6/2002 | Tom et al. | |
| 6,500,238 B1 * | 12/2002 | Brandes et al. | 95/148 |
| 6,540,819 B2 | 4/2003 | Tom et al. | |
| 6,558,457 B1 * | 5/2003 | Kolczyk | 96/134 |
| 6,592,653 B2 | 7/2003 | Wang et al. | |
| 6,660,063 B2 | 12/2003 | Tom et al. | |
| 6,716,271 B1 | 4/2004 | Arno et al. | |
| 6,743,278 B1 | 6/2004 | Carruthers | |
| 6,764,755 B2 | 7/2004 | Tom et al. | |
| 6,911,260 B2 | 6/2005 | Ren et al. | |
| 6,939,394 B2 * | 9/2005 | Carruthers | 96/108 |
| 6,991,671 B2 | 1/2006 | Brestovansky et al. | |
| 7,172,645 B1 * | 2/2007 | Pfister et al. | 95/116 |
| 7,494,530 B2 | 2/2009 | Carruthers | |
| 7,862,646 B2 * | 1/2011 | Carruthers et al. | 95/131 |
| 2002/0194989 A1 | 12/2002 | Tuma et al. | |
| 2003/0062312 A1 | 4/2003 | Cannon et al. | |
| 2003/0127385 A1 | 7/2003 | Spriegel | |
| 2005/0014643 A1 | 1/2005 | Lini et al. | |
| 2006/0011064 A1 | 1/2006 | Carruthers | |
| 2007/0031325 A1 | 2/2007 | Carruthers et al. | |
| 2009/0188392 A1 | 7/2009 | Carruthers | |
| 2010/0213083 A1 | 8/2010 | Olander et al. | |
| 2011/0277846 A1 | 11/2011 | Brestovansky et al. | |

FOREIGN PATENT DOCUMENTS

| | | |
|---|---|---|
| JP | 56-109809 A | 8/1981 |
| JP | 56-158126 A | 12/1981 |
| JP | 60-150831 A | 8/1985 |
| JP | 4-171046 A | 6/1992 |
| JP | 5-9015 | 1/1993 |
| JP | 06-002984 A | 1/1994 |
| JP | 08-200876 A | 8/1996 |
| JP | 10-141803 A | 5/1998 |
| JP | 10-185353 A | 7/1998 |
| JP | 11082891 A | 3/1999 |
| JP | 11-166772 A1 | 6/1999 |
| JP | 2002029724 A | 1/2002 |
| JP | 2004-261739 A | 9/2004 |
| WO | 02051525 A1 | 7/2002 |
| WO | 2007090104 A2 | 8/2007 |
| WO | 2007136887 A2 | 11/2007 |
| WO | 2008110233 A1 | 9/2008 |

OTHER PUBLICATIONS

"Co-pending U.S. Appl. No. 12/666,208", filed Dec. 2009.

* cited by examiner

NANOPOROUS ARTICLES AND METHODS OF MAKING SAME

CROSS-REFERENCE TO RELATED APPLICATIONS

This application is a continuation of U.S. patent application Ser. No. 12/182,880 filed Jul. 30, 2008, issued Jan. 4, 2011 as U.S. Pat. No. 7,862,646, which is a continuation-in-part under 35 USC §120 of International Patent Application No. PCT/US07/61255 filed Jan. 29, 2007 and International Patent Application No. PCT/US07/61256 filed Jan. 29, 2007, each in turn claiming the benefit of priority under 35 USC §119 of U.S. Provisional Patent Application No. 60/763,258 filed Jan. 30, 2006, the benefit of priority of which is also hereby claimed. The disclosures of all such applications and/or patents are hereby incorporated herein by reference, in their respective entireties, for all purposes.

FIELD OF THE INVENTION

The present invention relates to nanoporous articles, e.g., carbonaceous materials having utility for fluid storage/dispensing and desulfurization and other applications, and to apparatus and methods utilizing same. The present invention also relates to nanoporous carbon materials having utility for fluid storage/dispensing applications, and to systems and methods utilizing same, as well as impregnated nanoporous carbon materials useful in tribological applications and as ultra-tough structural materials.

DESCRIPTION OF THE RELATED ART

Carbonaceous materials are used as fluid adsorbent media in many applications, including fluid purification, fluid storage and dispensing, and fluid filtration.

One specific application of commercial significance is fluid storage and dispensing systems, wherein a carbonaceous adsorbent material is deployed to sorptively retain a fluid in an adsorbed state, and to release such fluid for dispensing under appropriate dispensing conditions, such as application of heat to effect thermal desorption of the fluid, application of reduced pressure conditions to effect desorption of the fluid, and/or application of a concentration gradient such as by flowing a carrier gas in contact with the adsorbent having the fluid adsorbed thereon to cause the desorption of the fluid and entrainment thereof in the carrier fluid.

A fluid storage and dispensing system is disclosed in U.S. Pat. No. 6,743,278 issued Jun. 1, 2004 in the name of J. Donald Carruthers for "Gas storage and dispensing system with monolithic carbon adsorbent," the disclosure of which is hereby incorporated herein by reference in its entirety, for all purposes. This patent describes a monolithic carbon physical adsorbent that is characterized by at least one of the following characteristics: (a) a fill density measured for arsine gas at 25° C. and pressure of 650 torr that is greater than 400 grams arsine per liter of adsorbent; (b) at least 30% of overall porosity of the adsorbent including slit-shaped pores having a size in a range of from about 0.3 to about 0.72 nanometer, and at least 20% of the overall porosity including micropores of diameter <2 nanometers; and (c) having been formed by pyrolysis and optional activation, at temperature(s) below 1000° C., and having a bulk density of from about 0.80 to about 2.0 grams per cubic centimeter.

In one embodiment, the monolithic carbon adsorbent is utilized in a puck or disc form, with a multiplicity of such articles being arranged in a stack in a containment vessel that is enclosed by valve head or other closure assembly. The stack of disc- or puck-form blocks of the carbon adsorbent material is efficient as a sorptive matrix for a variety of fluids, e.g., fluids used for semiconductor device manufacturing, but suffers the disadvantage that individual blocks in the stack can shift positionally, and impact or rub against the interior wall surfaces of the containment vessel and/or against one another, in response to movement of the vessel or shocks or impacts thereon, e.g., during transport of the vessel from a manufacturing facility to a fluid filling or end use facility.

In addition to causing unwanted noise, such impact and/or rubbing of the monolithic blocks can damage the blocks as well as cause them to generate carbon dust or fines. Such dust or fines are carried in the dispensed fluid stream, and adversely affect downstream pumps, compressors, valves and fluid-utilizing process equipment.

Another problem associated with the use of low-pressure adsorbent-based fluid storage and dispensing vessels that dispense fluid to vacuum or low pressure environments is that it becomes disproportionately more difficult to desorb and dispense the fluid as the inventory of fluid in the vessel drops to residual levels. The pressure drop from the vessel to a downstream tool or flow circuitry may in fact become too low to support dispensing, with the result that a substantial amount of fluid remains as so-called "heels" on the adsorbent in the vessel when dispensing can no longer take place. This heels portion then is lost as "non-removable" fluid.

Thus, the fluid storage and dispensing vessel may be taken out of service with a significant quantity of fluid still in the vessel. This circumstance results in reduced gas utilization efficiency. To improve fluid utilization, the vessel can be externally heated to drive off more fluid from the adsorbent. This approach, however, is not practical in many fluid dispensing applications, since the associated process facility is not adaptable to such external heating.

An improved approach therefore is desired to maximize fluid utilization in the use of low-pressure adsorbent-based fluid storage and dispensing vessels, for dispensing fluid to low pressure applications.

In addition to the issues described above related to fluid storage and dispensing systems, carbon is conventionally used as a component in high-strength composites, as a reinforcing medium. In addition, carbon is used in composite materials applications as a continuous medium in vitreous carbon composites, which are useful in a variety of tribological applications, but suffer the inherent disadvantage of being highly brittle and therefore subject to cracking and loss of physical integrity.

SUMMARY OF THE INVENTION

The present invention relates to nanoporous materials, and to apparatus and methods utilizing same.

In one aspect, the invention relates to an adsorbent having porosity expanded by contact with a first agent effecting such expansion and a pressurized second agent effecting transport of the first agent into said porosity, wherein the adsorbent subsequent to removal of said first and second agents retains expanded porosity.

Another aspect of the invention relates to a method of increasing loading capacity of an adsorbent for a fluid, said method comprising (i) contacting the adsorbent with a first agent effecting expansion of porosity of said adsorbent, (ii) contacting the adsorbent contacted with the first agent, with a second agent under superatmospheric pressure conditions effecting transport of the first and second agents into said porosity, and (iii) removing said first and second agents from said adsorbent.

Still another aspect of the invention relates to a nanoporous carbon composite including nanoporous carbon having porosity that is at least partially filled with material imparting to the composite an enhanced character with respect to characteristics selected from the group consisting of hardness, wear-resistance and toughness, as compared with the nanoporous carbon alone.

Additional aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
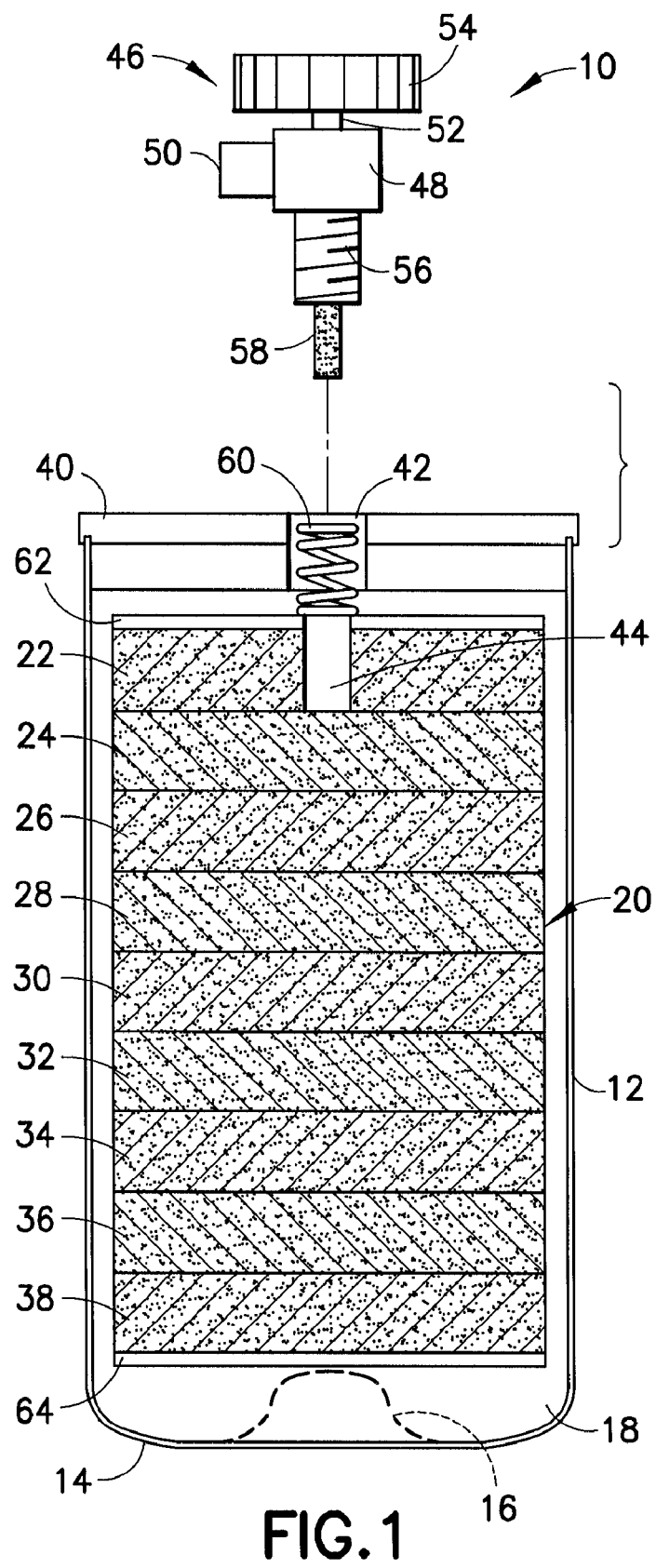
FIG. 1 is a schematic exploded elevation view, in partial cross-section, of a fluid storage and dispensing apparatus according to one embodiment of the invention.

The present invention in various aspects thereof relates to carbonaceous materials having utility for fluid storage/dispensing and desulfurization applications, and to apparatus and methods utilizing same.

In one aspect, the invention relates to provision of porous carbon as an adsorbent medium in a fluid storage and dispensing container, in monolithic form. Such monolithic form may include blocks, bricks, rods, etc., each formed of porous carbon, which may be aggregated to form an array or assembly for adsorption of fluid thereon and desorption of the fluid therefrom under dispensing conditions. The porous carbon in such respect may comprise an assembly of multiple porous carbon articles, or its may comprise a single monolithic block, cylinder, or other form of the porous carbon adsorbent.

In one preferred embodiment, the monolithic form of the porous carbon is cylindrical discs, which are assembled in a stacked array, so that the successive porous carbon discs are coaxial with one another, being of a same diameter. By this arrangement, the vertically extending stack can be inserted into a containment vessel and sealed, permitting adsorbable fluid to be charged to the containment vessel for adsorption on the porous carbon discs, and subsequent storage thereon. Thereafter, the vessel can be deployed at a fluid-utilizing site for dispensing of the adsorbate fluid, involving desorption of the adsorbed fluid from the porous carbon discs.

Such gas packaging involving a stacked array of porous carbon articles may be fabricated as more specifically described in U.S. Pat. No. 6,743,278 issued Jun. 1, 2004 in the name of J. Donald Carruthers for "Gas storage and dispensing system with monolithic carbon adsorbent," the disclosure of which is hereby incorporated herein by reference in its entirety, for all purposes.

In some applications of such gas packaging involving provision of a stacked or otherwise aggregated array of porous carbon discs or other porous carbon shapes, the individual porous carbon articles are susceptible to movement, producing an audible rattling in the vessel. If the vessel is being transported and subject to movement, e.g., in a trailer of a tractor-trailer vehicle, movement of the monolithic carbon articles allows them to develop momentum in relation to the containment vessel, and when the containment vessel motion is terminated, the monolithic carbon articles collide with the interior wall surface of the containment vessel, causing excessive noise as well as damage to the monolithic carbon articles.

To address such issues, the invention in another aspect provides positional stabilization structure in the containment vessel to retain the monolithic adsorbent articles in position and restrain their movement in relation to one another and in relation to the vessel. Such positional stabilization structure can be of any suitable type that is effective to fix and maintain the monolithic adsorbent articles in position in the vessel. The positional stabilization structure can for example include packings, fixture plates, resilient compression elements, screens, bags, adsorbent article configurations (e.g., with individual adsorbent articles being molded or otherwise formed to interlock or otherwise engage with one another, to positionally fix them in the array), vessel interior wall conformations (for example, longitudinal ribs on interior wall surfaces of the vessel that engage channels in the cylindrical side surfaces of successive adsorbent discs in a vertically stacked disc array), etc., as may be appropriate in a given fluid storage and dispensing apparatus employing the array of monolithic adsorbent articles.

The positional stabilization structure is advantageously formed of materials such as non-reactive metal and metal alloys, ceramics, polymers, and combinations thereof. Specific examples of materials of construction that may be used in various embodiments of the invention include stainless steel, aluminum, nickel and carbon.

In one embodiment, plate and spring assemblies are employed in the positional stabilization structure, to fix the position of the monolithic adsorbent articles in the multi-article array.

FIG. 1 is a schematic exploded elevation view, in partial cross-section, of a fluid storage and dispensing apparatus 10 illustrating such approach.

The fluid storage and dispensing apparatus 10 includes a vessel formed by cylindrical sidewall 12 and floor 14 which together with the circular top wall closure 40 encloses an interior volume 18. In the interior volume 18 is disposed a vertically stacked array 20 of monolithic porous carbon discs 22, 24, 26, 28, 30, 32, 34, 36 and 38. The topmost disc has a central opening 44 therein, to accommodate insertion thereinto of a particle filter 58 of the valve head assembly 46.

The monolithic porous carbon discs 22, 24, 26, 28, 30, 32, 34, 36 and 38 are each coaxial with one another and each is of a same diameter, with cylindrical side surfaces of the respective discs being vertically aligned with one another.

The floor 14 of the vessel may optionally include a central dimpled portion 16, as illustrated. The circular top wall closure 40 may be secured to the cylindrical sidewall 12 of the vessel in any suitable manner, e.g., by welding, brazing, mechanical fastening, etc. Additionally, the cylindrical sidewall may be threaded at an upper portion of its interior surface, whereby a complementarily threaded top wall closure can be threadably engaged with the cylindrical sidewall. The top wall closure has a central opening 42 therein, circumscribed by a threaded surface that is threadably engageable with a complementarily threaded tubular portion 56 of the valve head assembly 46.

The valve head assembly 46 includes a main valve body 48 having a valve element therein that is translatable between a fully opened and a fully closed position. Such valve element is coupled via valve stem 52 to handwheel 54. The valve element in the main valve body 48 is disposed in a valve cavity, or working volume, that communicates with a dispensing port of the outlet 50 secured to the main valve body 48. The valve cavity communicates with a passage in the threaded tubular portion 56 of the valve head assembly, and such threaded tubular portion in turn is coupled with particle filter 58.

The positional stabilization structure in the FIG. 1 embodiment includes a coil spring 60 that is reposed in the central opening 42 of the top wall closure 40, and an upper distribution plate 62 reposed on the top surface of the uppermost adsorbent disc 22. As shown, the upper distribution plate 62 is generally coextensive in diameter with the discs in the stacked disc array, and has a central opening that accommodates passage of the particle filter 58 therethrough into the central opening 44 of the uppermost adsorbent disc 22. In other embodiments, the upper distribution plate may be of greater or lesser diameter than the discs in the stacked array. When the valve head assembly 46 is threadably engaged with the threading in central opening 42, the coil spring is compressed to bear on the distribution plate, which in turn exerts compressive bearing pressure on the vertically stacked array 20 of porous carbon discs.

The positional stabilization structure in the FIG. 1 embodiment optionally further includes a lower distribution plate 64 arranged to engage the dimple 16 forming a protuberant bearing surface in the interior volume 18 of the fluid storage and dispensing vessel. Thus, the lower distribution plate 64 is reposed on the bearing surface of the dimple 16, and the vertically stacked array 20 of porous carbon discs in turn is reposed on the main top surface of such distribution plate. By this arrangement, the vertically stacked array 20 of porous carbon discs is compressively held between the upper and lower distribution plates, thereby securing the array against movement of the stack, or individual discs thereof against one another. The lower distribution plate may additionally be secured in position in the lower part of the vessel interior volume, by brackets, shelf elements, or other securement structure, as necessary or desirable in specific embodiments.

Figure 2:
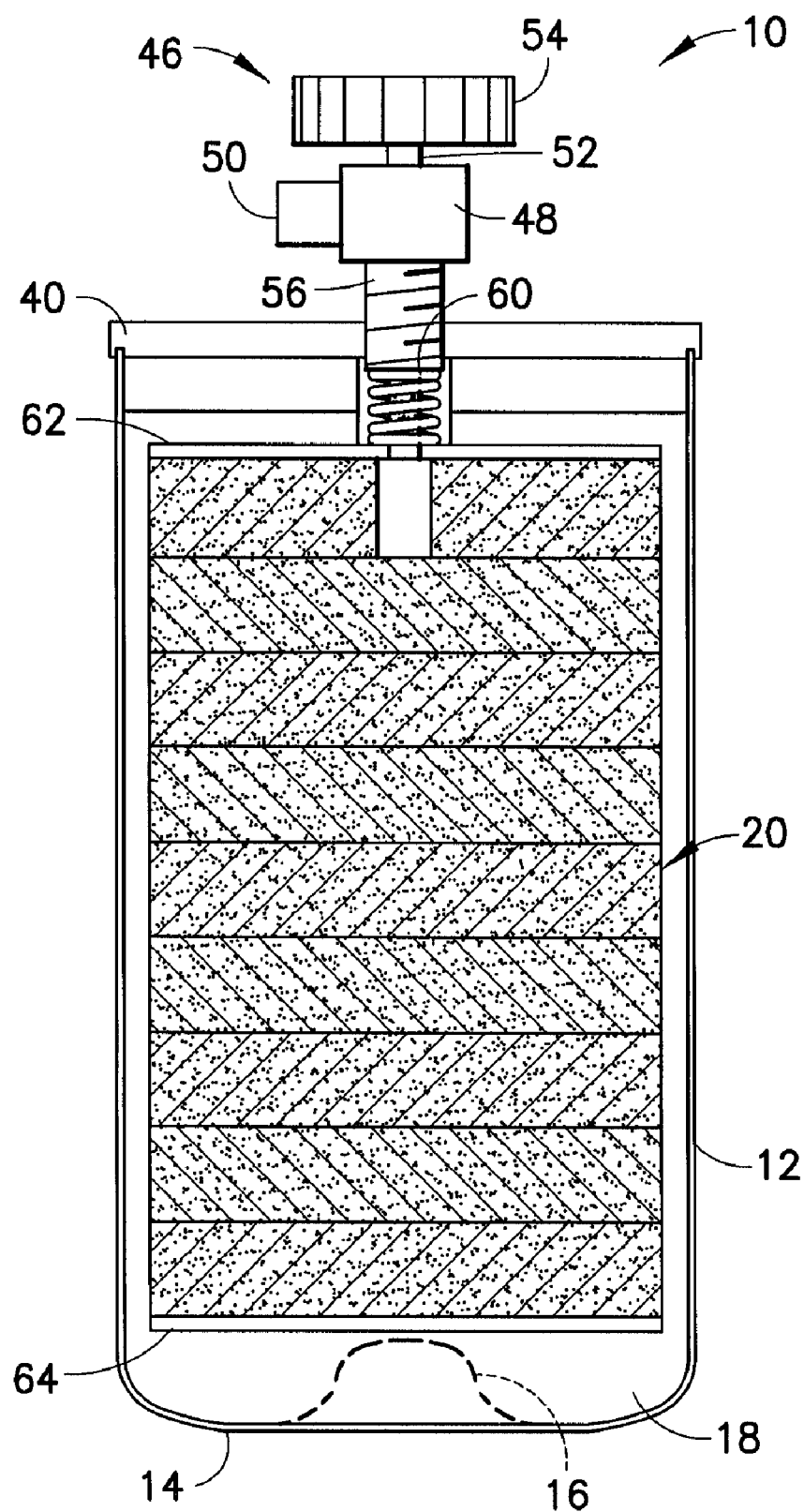
FIG. 2 is a schematic elevation view, in partial cross-section, of the fluid storage and dispensing apparatus of FIG. 1, as assembled.

FIG. 2 is a schematic elevation view, in partial cross-section, of the fluid storage and dispensing apparatus 10 of FIG. 1 as assembled, with the valve ahead 46 threadably engaged in the circular top wall closure 40 at the threaded tubular portion 56, and with the upper distribution plate 62 and lower distribution plate 64 compressively retaining the vertically stacked array 20 of porous carbon discs in position against movement and impact with the interior wall surfaces of the vessel. The parts and elements of the fluid storage and dispensing apparatus 10 in FIG. 2 are numbered correspondingly with respect to the same elements in FIG. 1.

Figure 3:
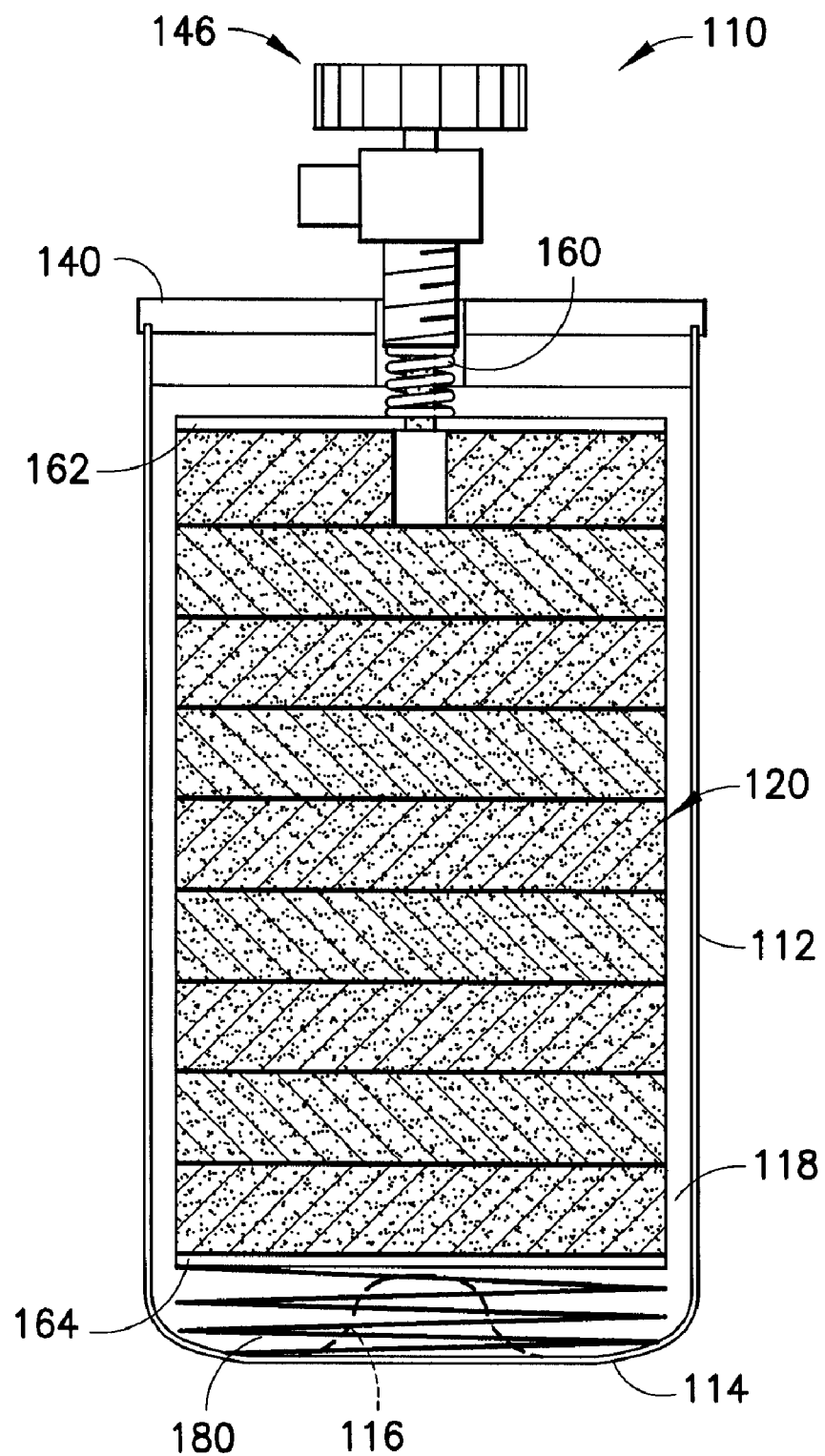
FIG. 3 is a schematic elevation view, in partial cross-section, of a fluid storage and dispensing apparatus according to another embodiment of the invention.

FIG. 3 is a schematic elevation view, in partial cross-section, of a fluid storage and dispensing apparatus 110 according to another embodiment of the invention. In the FIG. 3 embodiment, the parts and elements corresponding to those of the FIGS. 1-2 embodiment are correspondingly numbered, by addition of 100 to the number of the corresponding part or element in FIGS. 1 and 2.

The FIG. 3 embodiment differs from the embodiment of FIGS. 1 and 2, in the provision of a helical compression element at the lower portion of the vessel, in the form of coil spring 180. The coil spring 180 rests on the floor 114 of the vessel and exerts upward compressive force on the distribution plate 164, which in turn spreads the compressive force over the entire bottom face of the lowermost porous carbon disc in the vertically stacked array 120. Such dual-spring arrangement enhances the load bearing character of the lower distribution plate 164.

Figure 4:
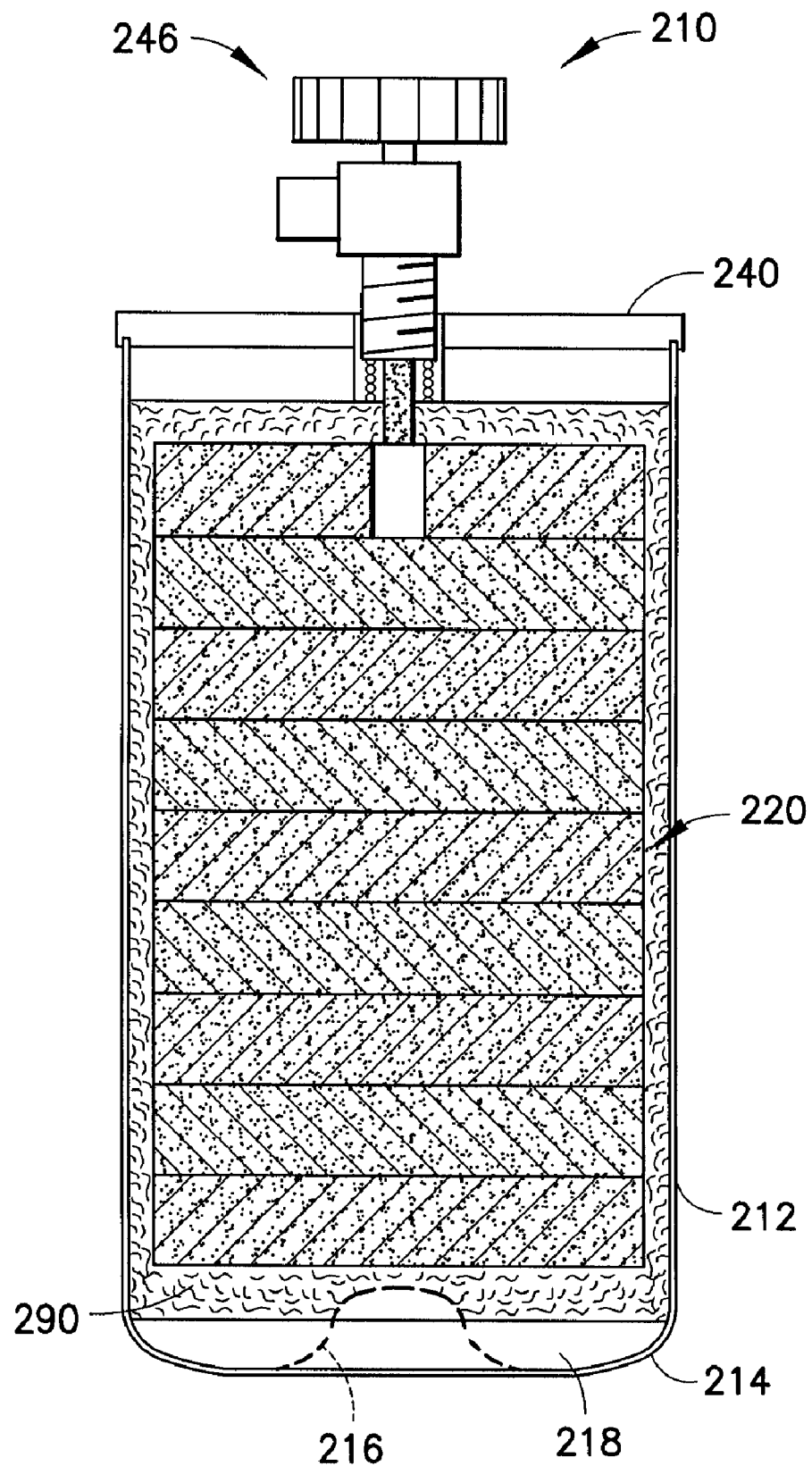
FIG. 4 is a schematic elevation view, in partial cross-section, of a fluid storage and dispensing apparatus according to yet another embodiment of the invention.

FIG. 4 is a schematic elevation view, in partial cross-section, of a fluid storage and dispensing apparatus to 10 according to yet another embodiment of the invention, wherein corresponding parts and elements to the embodiment of FIGS. 1 and 2 are correspondingly numbered, by addition of 200 to the reference numeral of the corresponding part or element of FIGS. 1-2.

In the FIG. 4 embodiment, the positional stabilization structure includes a packing of mesh material 290, which may be provided in the form of a batting or sheet material that is wrapped about the vertical stacked array 220 of porous carbon discs. Additional mesh material is provided at the upper portion of the interior volume 218, overlying the main top surface of the uppermost porous carbon disc in the array 220, as well as at the lower portion of the interior volume 218, beneath the main bottom surface of the lowermost porous carbon disc in the array 220.

The springs used in the above-described embodiments can be formed of any suitable materials of construction that are compatible with the chemistry that is being used, and compatible with the process in which the dispensed fluid is to be employed. The upper spring is placed in the threaded cylinder opening (e.g., the central opening 42 in the top wall closure 40 as shown in FIG. 1) prior to the "valving in" of the container, i.e., rotationally engaging the threading of the threaded tubular portion 56 with the threading circumscribing the opening 42 in the top wall closure.

The upper spring is sized such that the valving process compresses the spring between the bottom of the valve (bottom face of the tubular threaded portion 56) and the distribution plate overlying the uppermost porous carbon article in the vertically stacked array of porous carbon articles. It will be recognized that the distribution plate overlying the uppermost porous carbon article may in some instances not be required and is generally an optional additional component of the stabilization structure, but such plate is typically preferred to spread the compressive force exerted by the spring over the full facial area of the face of the adjacent porous carbon article in the stacked array.

The force applied by the compressed upper spring is selected to be sufficiently large to effect friction between the monolithic porous carbon particles, between the porous carbon articles and the containment vessel, and between the uppermost porous carbon article and the spring, which will restrain, and preferably eliminate, movement of the porous carbon articles incident to handling, transport or other translation of the vessel, as well as susceptibility to movement due to shock, vibration, and impact. The positional stabilization structure therefore damps the force of any contact between any of the porous carbon articles, and the interior of the containment vessel, minimizing the likelihood of damage of the porous carbon articles as a result of such contact, and minimizing or eliminating noise resulting from such contact.

An alternative approach for deployment of a spring contacting the uppermost porous carbon article in the array involves inserting the spring prior to welding of the cylinder, so that the spring is in contact with the interior face of the top wall closure of the containment vessel at an upper end of the spring, and in contact with the uppermost porous carbon article (or a distribution plate thereover) at a lower end of the spring.

The provision of a second, lower spring in the containment vessel, beneath the stacked array of porous carbon articles (as in FIG. 3), allows the suspension of the stacked array between the respective upper and lower springs, and minimizes or eliminates the contact of the porous carbon articles with interior surfaces of the containment vessel. Such approach also serves to damp the force of any contact between the porous carbon articles and the interior surfaces of the containment vessel, to minimize the incidence of damage to the porous carbon articles by such contact, and minimizing or eliminating noise resulting from such contact.

As indicated, the provision of pressure distribution plates serves to distribute compressive forces exerted by the spring across the full facial area of the porous carbon article(s) that is/are in contact with the distribution plate. Such distribution of force reduces the potential for fragmentation of the porous carbon articles due to sudden impacts.

The springs generally may be of any suitable type, including, without limitation, coil type springs, wave type springs, o-rings, polymer cushions, multiple coil type springs, multiple wave type springs, and multiple polymer cushions.

Packing materials utilized in the positional stabilization structure, as illustratively shown in FIG. 4, can be used to restrain or cushion movement of the porous carbon articles inside the containment vessel. The packing material can be of any suitable composition, and can be in the form of a cloth or mesh material.

In one preferred embodiment, the porous carbon articles are wrapped in a cloth made of carbon fiber (preferably formed of activated carbon) prior to insertion of the porous carbon articles into the interior volume of the containment vessel. Such wrapping of the porous carbon articles serves to dampen all contacts between the stacked array of porous carbon articles and the interior surface of the containment vessel, and may provide significant independent gas storage capacity, to augment that of the porous carbon articles wrapped in the carbon fiber cloth. The mesh size of the wrapping can be readily optimized, by the expedient of simple empirical determination, to allow gas flow across the wrap that satisfies the process requirements of the end-use application of the dispensed fluid, while enabling effective dampening of shock, concurrent protection of the porous carbon articles, and minimization of the volume requirement for the wrapped stacked array in the interior volume of the containment vessel.

Excess wrapping medium from the packing operation can be left in the upper and lower portions of the interior volume in the containment vessel, to function as a cushion for the stacked array, as shown in FIG. 4. The wrapping medium can simply be wrapped around the porous carbon articles before their insertion into the interior volume of the containment vessel, with the excess wrapping material at the respective ends being folded or twisted to constitute additional cushioning masses above and below the stacked array.

Alternatively, the wrapping medium may be preformed into a sealed tube, through an open end thereof, prior to placement of the porous carbon articles into the tube and sealing of such open end thereof.

If a very fine mesh wrapping medium is employed, such medium also serves as a particle filter to prevent particulates, such as may reside on the porous carbon articles, from migrating out of the containment vessel during the dispensing of fluid therefrom.

In general, the wrapping medium may be of any suitable type, formed of any appropriate material construction, such as carbon, fiberglass, metal, polymer, etc., depending on material compatibility considerations, with respect to the materials utilized in the fluid storage and dispensing apparatus and materials used in the fluid-utilizing apparatus or process that receives the dispensed fluid from the fluid storage and dispensing containment vessel.

It will be recognized that the positional stabilization structure utilized to maintain the array of monolithic porous carbon articles in a fixed position, can be varied widely in the broad practice of the present invention, utilizing various structural elements and approaches to minimize or eliminate movement of the porous carbon articles in the interior volume of the container in which they are disposed.

In another aspect of the invention, porous carbon adsorbent is utilized for removal of highly refractory, difficult-to-remove (by standard catalytic desulfurization techniques) aromatic sulfur-containing molecules from hydrocarbon feedstocks such as gasoline, jet or diesel fuel, or crude oil, petroleum or other precursors or source materials therefor.

There is currently a movement in worldwide environmental legislation toward requiring improved emission controls from gasoline- and diesel-fueled vehicles. Sulfur-containing molecules in the feedstocks for such fuels must be removed in order for catalytic controls to be effective at the levels of emission control necessary to meet new legislative constraints (e.g., in the U.S., sulfur levels in gasoline must be reduced from the current 300 ppm sulfur limit to 30 ppm by 2006 and sulfur in diesel fuels must be reduced from the current maximum of 500 ppm to 15 ppm by 2006; concurrently, Japan is requiring sulfur in diesel fuels to be reduced to 10 ppm by 2007; the European Union is requiring sulfur content of gasoline to be reduced to 50 ppm in 2005; and Germany is requiring sulfur content of diesel fuels to be reduced to 10 ppm by 2006).

Newly developing fuel-cell engines for vehicular applications, operating with on-board fuel processors, require even greater levels of desulfurization than is required by conventional internal combustion engine power systems. For example, polymer electrolyte membrane (PEM) fuel cell engines require sulfur levels that typically are below 1 ppm.

Current catalytic hydrodesulfurization techniques can achieve sulfur levels close to these required limits, particularly for diesel fuels, but there remain very refractory sulfur molecules that defy conversion. These residual refractory sulfur molecules tend to be sterically-hindered molecules, such as dibenzothiophene, 4-methyldibenzothiophene and the most refractory, 4,6-dimethyldibenzothiophene.

In gasoline production, the sulfur molecules in the naphtha fraction of the distillate do not include all of the aforementioned refractory molecules, but there is another complication. Hydrodesulfurization of this fraction could be very effective in principle, but the operating conditions of conventional hydrodesulfurization units convert many of the 'high octane' olefinic molecules into 'low octane' saturates, with consequent downgarding of the quality of the fuel (olefins can be present in amounts of up to 40% of the gasoline fraction).

The present invention overcomes this deficiency by effecting adsorptive removal of refractory sulfur molecules such as dibenzothiophene, 4-methyldibenzothiophene and 4,6-dimethyldibenzothiophene, utilizing nanoporous carbon having porosity predominantly constituted by pores of less than 1 nm diameter.

The invention therefore contemplates the use of a nanoporous carbon of such type for removing refractory, flat-conformation molecules that otherwise constitute an obstacle to achieving ultra-low sulfur fuels.

In one embodiment of the invention, the nanoporous carbon is constituted by a polyvinylidene chloride (PVDC)-derived carbon that provides a highly effective adsorbent medium for removing refractory sulfur-containing molecules from liquid phase transportation fuels (gasoline, diesel, jet fuels) to achieve the levels of deep desulfurization necessary to meet environmental legislative constraints.

The nanoporous PVDC carbon is suitably formed as more fully described in U.S. Pat. No. 6,743,278 issued Jun. 1, 2004 in the name of J. Donald Carruthers for "Gas Storage and Dispensing System with Monolithic Carbon Adsorbent," the disclosure of which hereby is incorporated herein by reference, in its entirety.

Figure 5:
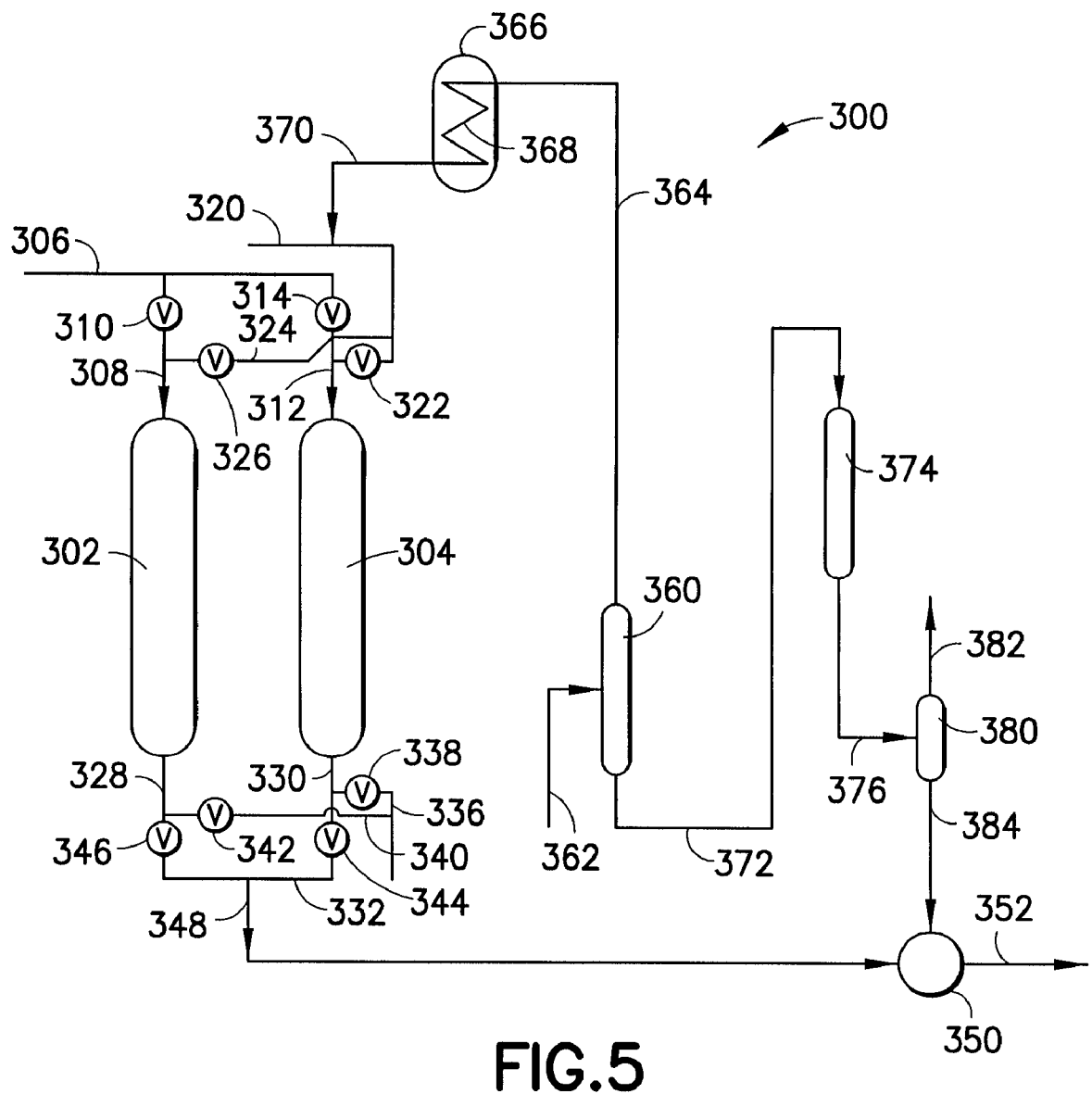
FIG. 5 is a schematic representation of an adsorbent-based process system for deep desulfurization of sulfur-containing hydrocarbon feedstocks.

FIG. 5 is a schematic representation of an adsorbent-based process system 300 for deep desulfurization of sulfur-containing hydrocarbon feedstocks.

As illustrated in FIG. 5, the process system includes two adsorbers 302 and 304, manifolded together to allow flow of fluid therethrough. Each of the adsorbers includes a vessel having a bed of the nanoporous carbon therein. The bed may be a fixed bed or a fluidized bed, as necessary or desired in a given application of the process system technology of the invention. The bed can be formed of monolithic (bulk form) nanoporous carbon articles in the case of a fixed bed, and in the case of a fluidized bed is constituted by finely divided particles, e.g., in the form of cylindrical pellets, spherical particles, rings, cruciform shaped articles, etc., or any other shape or form appropriate to fluidization and effective for removal of highly refractory sulfur compounds from hydrocarbon raw material containing same.

The two adsorbers 302 and 304 are manifolded to one another by an inlet manifold 306 joined to respective feed lines 308 and 312 containing flow control valves 310 and 314 therein, respectively. The feed lines 308 and 312 are additionally connected to a purge line 320, which includes a distal portion of the purge line containing flow control valve 322 therein, and joined to feed line 12, with a branch line 324 containing flow control valve 326 therein, joined to feed line 308. The purge line 320 is joined in flow communication with a source of purge gas (not shown in FIG. 5).

The two adsorbers 302 and 304 are also manifolded to one another at their outlet ends, by an outlet manifold assembly including discharge manifold line 322, joined to discharge line 328 from adsorber 302 containing flow control valve 346 therein, and joined to discharge line 330 from adsorber 304, containing flow control valve 344 therein. The discharge manifold line 322 is joined to product line 348 for flow of the desulfurized hydrocarbon to blender 350 for mixing therein with hydrodesulfurized hydrocarbon from the hydrodesulfurization reactor 374, as hereinafter more fully described, to yield an ultralow sulfur product hydrocarbon stream, discharge from the blender in discharge line 352.

The outlet manifold assembly also includes a desorbate discharge line 336 containing flow control valve 338 therein for discharging desorbate from adsorber 304, and desorbate discharge line 340 containing flow control valve 342 therein, for discharge of sulfur-containing desorbate from adsorber 302. The respective desorbate discharge lines 336 and 340 are joined in turn to desorbate feed line 362, which feeds the sulfur-containing desorbate to the evaporator 360.

Evaporator 360 produces a high sulfur fraction bottoms that is flowed in line 372 to the hydrodesulfurization reactor 374 for reaction with hydrogen, introduced to the reactor in hydrogen feed line 373. The hydrodesulfurized hydrocarbon from the hydrodesulfurization reactor then is flowed in line 376 to the separator, from which hydrogen sulfide and hydrogen gas are separated as overhead discharged in line 382, and desulfurized hydrocarbon bottoms flowed in line 384 to the blender 350.

The evaporator 360 produces a sulfur-depleted overhead, that is flowed in recycle line 364 through the heat exchange passage 368 in cooler 366 to condense the sulfur-depleted overhead. The sulfur-depleted overhead then is flowed from the condenser in line 370 to the purge gas feed line 320, for recycle to the on-stream adsorber. By the condensation and recycle of the sulfur-depleted overhead from the evaporator to the on-stream adsorber, the overall yield of the purified hydrocarbon ultimately discharged as product in line 352 is enhanced.

In operation, one of the adsorbers 302 and 304 is on stream actively processing the feedstock hydrocarbon that is flowed into such adsorber in the inlet manifold, to produce a reduced sulfur hydrocarbon stream. The reduced sulfur hydrocarbon stream is discharged from such adsorber by the discharge manifold, and passes to the blender.

While the on-stream adsorber is processing hydrocarbon, the off-stream adsorber during a portion of its off-stream duration is subjected to purging with a suitable purge medium introduced in purge feed line 320 to such off-stream adsorber. The purging operation effects desorption of the highly refractory sulfur compounds from the nanoporous carbon adsorbent, and the desorbed compounds are conveyed in the carrier purge gas stream to the evaporator 360.

The process system 300 shown in FIG. 5 utilizing nanoporous PVDC adsorbent in adsorbers 302 and 304 is capable of producing desulfurized product hydrocarbon having less than 1 ppm of each of dibenzothiophene, 4-methyldibenzothiophene and 4,6-dimethyldibenzothiophene therein.

A particularly preferred nanoporous carbon adsorbent for such desulfurization process is a PVDC char material having at least 30% of overall porosity constituted by slit-shaped pores having a size in a range of from about 0.3 to about 0.72 nanometer, and at least 20% of the overall porosity comprising pores of diameter <2 nanometers, with a bulk density of from about 0.80 to about 2.0 grams per cubic centimeter.

The invention in another aspect contemplates an adsorbent-based storage and dispensing apparatus, including a container having an interior volume in which is disposed a plurality of individual adsorbent articles, with a coupling structure adapted to couple the individual adsorbent articles with one another so that they are positionally stabilized against movement in relation to one another, with the coupling structure being secured to the container.

The coupling structure in one embodiment includes at least one rod passing through the individual adsorbent articles, wherein the rod has a first end that is secured to the container and a second end that is coupled with a mechanical fastener, such as by a threaded coupling. The rod at its first end may be threadably engaged with the container.

The container can be constructed to include a closure member to which the coupling structure is secured.

The individual adsorbent articles in a preferred embodiment are coupled to one another to form an assembly of such individual adsorbent articles that does not contact the interior surface of the container. Each of the individual adsorbent articles can be disk-shaped, and the disk-shaped articles can be coupled by the coupling structure to form a positionally fixed stack of the adsorbent articles. The disk-shaped articles can be of any suitable size. Preferably, all of such disk-shaped articles are the same size, so that when stacked, the stack of disk-shaped articles is cylindrical in form.

The coupling structure can be of any suitable type. As mentioned, the coupling structure can include a rod and when the adsorbent articles form is that, each of the individual adsorbent articles can include an opening therethrough, so that the rod extends through the opening in each of the stacked articles. When the stack is cylindrical in form, the rod may extend through the stack in a direction parallel to a central axis of the stack.

A lowermost adsorbent article in the stack can have a cavity formed therein, to accommodate attachment of a fastener to the rod. The apparatus may include two or more rods, e.g., two rods that are in spaced-apart relation to one another. An uppermost adsorbent article in the stack likewise can have a cavity formed therein, in which is at least partially disposed a particle filter. The particle filter can be coupled with a valve assembly for dispensing fluid from the container. The valve assembly can be threadably engaged with the container, and can include a flow control member, and that is coupled with a valve element in a valve cavity in the valve assembly, such that the valve element is translatable between a fully closed position and a fully open position.

Thus, the invention contemplates an adsorbent-based storage and dispensing apparatus, which may be embodied as a container having an interior volume, with a mounting member in the interior volume and secured to the container, and a plurality of individual adsorbent articles mounted on the mounting member in the interior volume, so that the individual adsorbent articles are positionally stabilized against movement in relation to one another.

The adsorbent in a preferred embodiment comprises carbon, but more generally may comprise any suitable sorbent material having sorptive affinity to the fluid that is to be stored in and dispensed from the container holding the adsorbent. The adsorbent in use has a fluid stored thereon, that is selectively dispensed from the vessel, e.g., for flow to a microelectronic device manufacturing tool or other fluid utilizing device.

The adsorbed fluid can be of any suitable type, e.g., a fluid useful in semiconductor manufacturing, such as organometallic precursors, hydrides, halides, acid gases, etc., or a fluid useful in operation of a solar cell, fuel cell, etc.

The container holding the adsorbent articles can have a dispensing assembly coupled with the container, for dispensing of fluid from the container to downstream flow circuitry or other locus of use or transport.

In the container, a gasket or cushioning element, or a pressure distribution plate, can be provided to contact at least one individual adsorbent article in the plurality of individual adsorbent articles that are fixedly positioned by the above-described rod and mechanical fastener assembly, or other positional fixturing structure. The purpose of such elements is to increase the resistance of the assemblage of adsorbent articles to damage in the event of shock or impact, and to further reduce any incidence of relative movement of the individual adsorbent articles that could result in generation of fines or particles.

Figure 6:
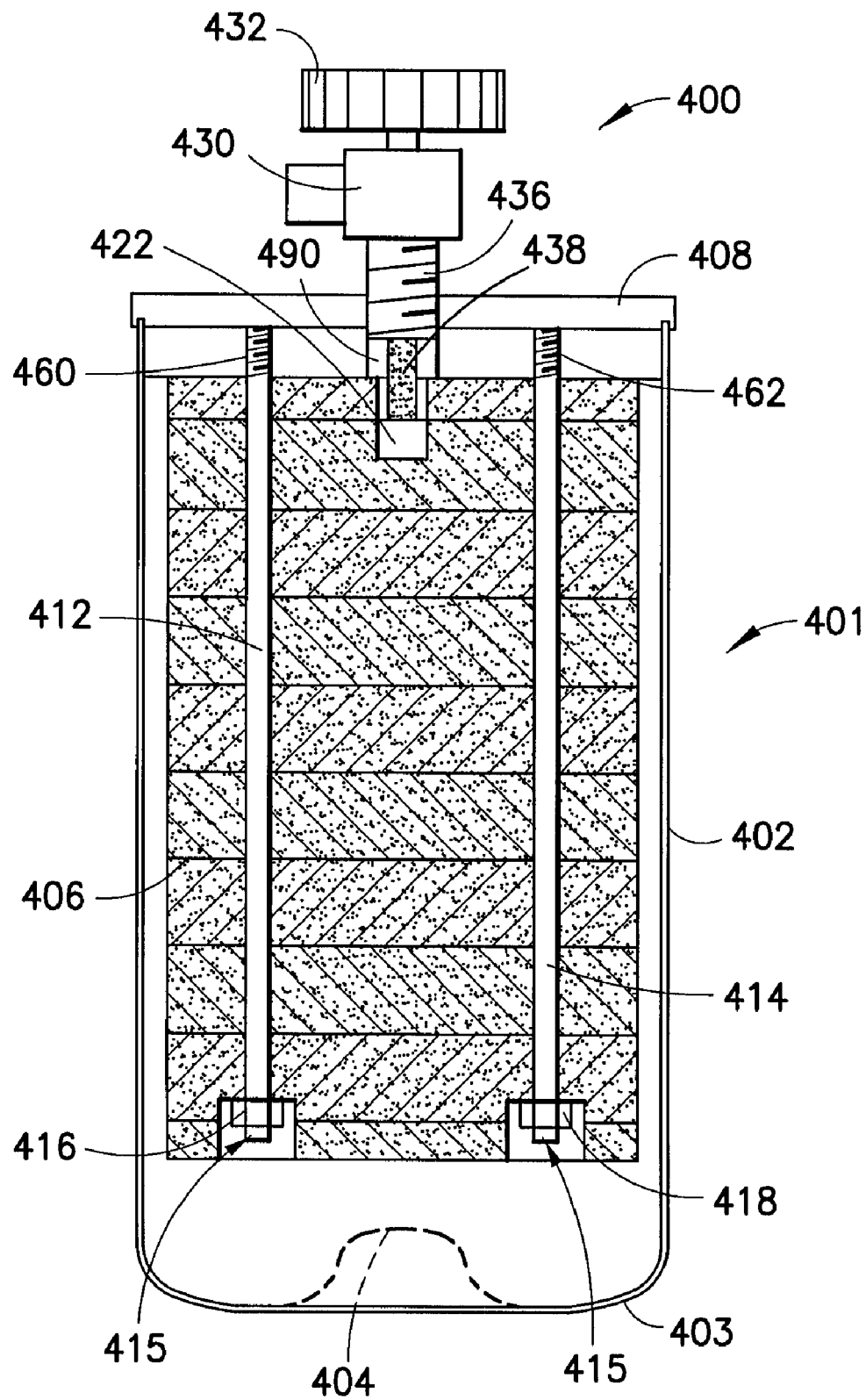
FIG. 6 is a cross-sectional elevational view of a fluid storage and dispensing apparatus incorporating a adsorbent article fixturing assembly, according to one embodiment of the present invention.

FIG. 6 is a cross-sectional elevational view of a fluid storage and dispensing apparatus 400 incorporating an adsorbent fixturing assembly, according to one embodiment of the present invention.

The fluid storage and dispensing apparatus 400 includes a fluid storage and dispensing vessel 401 having a vessel side wall 402 and floor 403 having a central cavity (dimple) 404 therein. The apparatus includes a top closure member 408 having central opening 490 therein to accommodate passage therethrough of the threaded stem 436 of a valve head assembly. The threaded stem 436 has a particle filter 438 joined to its lower end, which serves to filter the dispensed fluid to remove fines and particulates therefrom. The particle filter 438 is accommodated at its lower end by a central opening 422 in the uppermost physical adsorbent article.

The valve head assembly includes a valve body 430 containing a valve cavity therein (not shown in FIG. 6) communicating with a discharge passage. The valve cavity contains a translatable valve element that is movable between a fully open and a fully closed position, with the valve element being coupled to the valve hand wheel 432 for manual actuation of the valve.

The vessel 401 and top closure member 408 together enclose an interior volume of the vessel in which is disposed a vertically stacked array of physical adsorbent articles, or pucks, that are each of cylindrical disk shape, and that when stacked with side surfaces in register with one another forms a columnar monolithic adsorbent article 406.

The top closure member 408 also contains openings 460 and 462 therein in which rods 412 and 414 are threaded, welded, press fit or otherwise coupled with the top closure member. The rods 412 and 414 extend vertically downwardly through the stack of physical adsorbent pucks and at their lower ends are secured by locking assemblies 415. Specifically, the rods at their lower ends of the rods 412 and 414 are threaded, and the threaded ends are engaged with nuts 416 and 418. The nuts 416 and 418 are reposed in associated openings in the lowermost puck in the stacked array.

By tightening the nuts on the threaded rods until the nuts are in bearing contact with the floors of the cavities, the vertically stacked puck array is held in a fixed position. Washers, rings, lock-nuts and gaskets may be employed in securing the stacked puck array with the rods, as a fixturing assembly. The fixturing assembly permits the stacked puck array to be positionally secured in the interior volume of the vessel 401, so that the stacked puck array does not impact the interior wall surface of the vessel, and so that individual pucks in the array do not rub against one another to generate fines or dust, and so that the pucks do not translate in relation to one another to generate unwanted noise.

In the stacked assembly as secured by the rod assembly, the rods can be secured to the closure member, as illustrated, or may alternatively be secured to the floor of the vessel, with the rods passing through openings in the pucks. The rods, as mentioned, may be secured at one end (to the closure member or to the floor of the vessel) by threadable engagement with threaded receiving openings in the closure member or the floor, or by welds, gluing, press fitting, or any other method or means of securement. The pucks are secured onto the rods by nuts or other fastening techniques such as peening, gluing, press fitting, or the like.

The contact surfaces between the pucks, or between the fasteners and the pucks, or between the closure member and the pucks, can be gasketed to prevent pointed contact between the pucks and hard surfaces to minimize the occurrence of excess pressure on small areas of the pucks that could otherwise cause fracture of the pucks. The gasketing thereby acts as a cushion for the pucks. Springs and lock washers may be incorporated into the design to provide cushioning as well, either with or without other gasketing or cushioning type materials. The fasteners can be combined with pressure distributing techniques such as a pressure distribution plate or washers to displace pressure over a greater surface area to minimize the potential for damage to the pucks.

The number of rods used in the fixturing assembly can be determined by the diameter and the length of the rods, the height of the stacked array of pucks, the mechanical characteristics of the pucks, the mechanical characteristics of the rods and the service-handling requirements of the intended use application of the fluid storage and dispensing apparatus.

The materials of construction of the gaskets, rods, fasteners, distribution plates and springs used in the fluid storage and dispensing apparatus will be determined by the diameter and length of the rods, the height of the stacked puck array, the mechanical characteristics of the pucks, the mechanical characteristics of the rods and the service-handling-chemical requirements of the intended use application of the fluid storage and dispensing apparatus.

The stacked puck array fixturing assembly of the invention overcomes the problems incident to movements of the component pucks in the stacked array in the vessel, and prevents such problems from adversely impacting the fluid storage and dispensing apparatus service life, performance, or adverse user impressions associated with noise generation. This fixtured stacked array provides a greater degree of stability for the pucks, since the pucks are positionally secured in the interior volume of the vessel to such extent that there is little or no independent motion of the pucks themselves.

The invention in another aspect relates to an infrared emitter device, including a container having an interior volume holding silane gas in an adsorbed state. The container includes an oxygen-selective permeation element allowing selective ingress of oxygen from an ambient environment of the container into the interior volume, and an insulative medium is disposed in the interior volume of the container adapted to enhance infrared emissivity of the device.

The silane gas in the container in a preferred embodiment is held in an adsorbed state on a carbon adsorbent, e.g., an adsorbent in a monolithic form, such as a cylindrical or rectangular block or brick, or an adsorbent in a finely divided or other form. The silane gas can be held in the interior volume of the container at any suitable pressure, e.g., a subatmospheric pressure.

The insulative medium can by way of example include a silica-based aerogel thermal insulation, and the oxygen-selective permeation element can comprise an oxygen permselective membrane of suitable type. The container can be formed of any suitable material, such as a plastic material or glass material. Optionally, the container can include reflective elements in the interior volume, with the reflective elements being adapted to reduce thermal conductivity heat losses from the container, and to control emissivity consistent with the requirements of providing an extended duration infrared radiation signature from the device.

In preferred practice, the device is designed to hold sufficient silane gas and to allow ingress of oxygen sufficient to generate an infrared radiation signature for a period of at least five days, more preferably for a period of at least 10 days, and most preferably for a period of at least 15 days. Such extended duration IR signature achieves a substantial advance in the art, relative to chemical lighting markers utilized in the prior art, whose signature duration is at best only a fraction of a day.

The invention correspondingly provides a method of generating an extended infrared radiation signature, by permeating oxygen through an oxygen-selective permeation element, and reacting the permeated oxygen with silane held in an adsorbed state, thereby generating the radiation signature.

In carrying out such method in preferred practice, thereof, the permeated oxygen and silane are reacted in a container holding a carbon adsorbent having silane adsorbed thereon, preferably with an insulative medium in the container that is arranged to enhance infrared emissivity deriving from the reaction of silane and permeated oxygen, and the carbon adsorbent preferably is of a monolithic form, as previously described. The term "enhance" in reference to the emissivity deriving from the reaction of silane and oxygen, means that the infrared emissivity deriving from such reaction is greater than is achievable in a corresponding reaction in which the insulative medium is not employed.

The invention in a specific aspect contemplates infrared emitting marker sticks that produce a signature detectable by infrared detection apparatus. The infrared marker sticks overcome the problems associated with currently used chemiluminescence sticks relating to their limited lifetimes. Chemiluminescent sticks typically have an illumination lifetime of 3-8 hours. The infrared marker sticks of the invention provides a longer lasting emitter device that reduces the number of sticks needed for a given end use application, and enable long emitter life applications that heretofore have been unattainable by chemiluminescent marker sticks.

The infrared emitting marker stick of the invention utilizes slow controlled combustion of silane gas to maintain a constant elevated temperature. Normally considered as a hazardous gas, silane is used in the infrared emitting marker stick in an inherently safe and energy efficient device.

The infrared emitting marker stick of the invention comprises four primary components: (i) silane gas, a readily available commodity gas, (ii) a nanoporous carbon adsorbent in monolithic form, commercially available from ATMI, Inc. (Danbury, Conn., USA) under the trademark "Mblock;" (iii) silica-based aerogel thermal insulation, commercially available from Aspen Aerogels, Inc. under the trademark "Spaceloft," and (iv) an oxygen-selective flow rate limiting membrane medium, e.g., of a type commercially available from Mott Metalurgical.

In the infrared emitting marker stick of the invention, silane is stored on the nanoporous carbon adsorbent in an appropriate amount and at an appropriate pressure for the desired marker application.

For example, in a given embodiment, 0.75 mole of silane may be stored on the nanoporous carbon adsorbent at a pressure of 380 torr. Oxygen is leaked through the oxygen-selective flow rate limiting membrane medium at a suitable rate, e.g., 1.3 sccm in the illustrative example. The silane in the presence of oxygen is combusted to form $SiO_2$ and $H_2O$, releasing 1.5 Megajoules per mole of silane. At a permeation rate of 1.3 sccm of $O_2$, 0.73 watt of energy is produced. The aerogel insulation may be used in combination with metal reflectors to minimize losses due to thermal conductivity effects and to control the emissivity aperture, resulting in an internal temperature rise, with negligible external increase in temperature. The 0.73 watt energy production then is dissipated by IR radiation, creating the IR signature. The $SiO_2$ based insulation is essentially IR transparent. As a result, at a radiation rate of 0.73 watt, 0.75 moles of $SiH4$ will last approximately 17 days.

The advantages of the infrared emitter marker device of the invention include (i) production of a high specific energy density, e.g., 6.5 times the energy density of corresponding iron oxidation on a per gram of starting material basis, (ii) provision of long life service as compared to 3-8 hour chemiluminescent light sticks and up to 20 hours for iron-based heat packs, (iii) the use of only low-cost components ($SiO_2$ insulation, $SiH_4$ gas, carbon, aluminum shields), without the need for expensive precious metal catalysts, (iv) the production of non-toxic end products (charcoal, sand and water), unlike butane-based heaters, and (v) the achievement of sub-atmospheric pressure safety as a result of the silane gas being contained at sub-atmospheric pressure.

Figure 7:
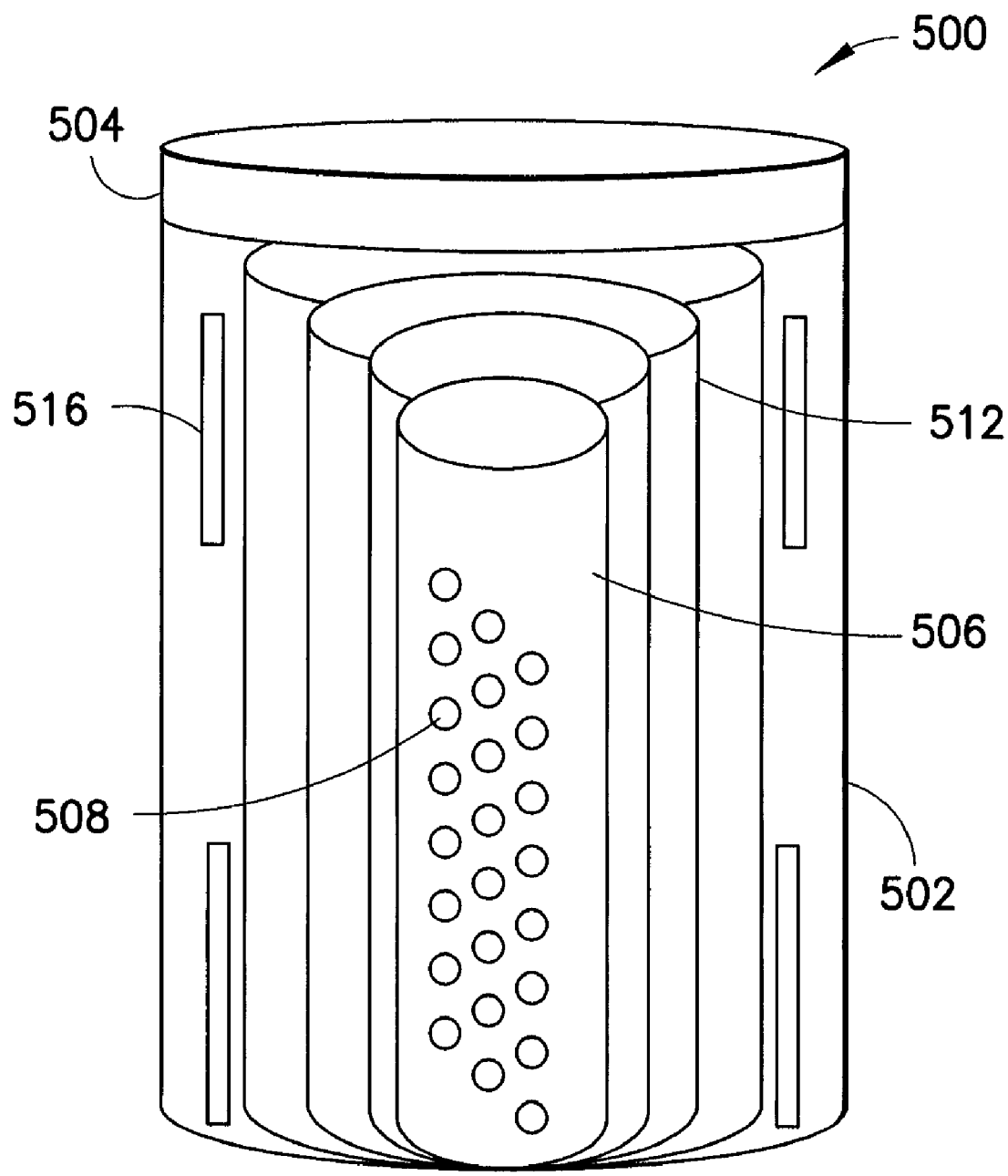
FIG. 7 is a schematic representation of an infrared emitter device according to another embodiment of the present invention.

FIG. 7 is a schematic representation of an infrared emitter device 500 according to another embodiment of the present invention.

The emitter device includes a container 502 fabricated of plastic or glass material in which is disposed a block or other preferably bulk form of an adsorbent 506. This adsorbent body holds adsorbed silane 508 thereon and is wrapped or otherwise surrounded with infrared transparent thermal insulation 512. The container is capped with a porous oxygen separator and flow restrictor element 504, which is permselective to allow oxygen to enter the container for reaction therein with the adsorbed silane on the adsorbent. The container on interior wall surface thereof has mounted an array of reflectors 516.

The IR emitter device of the invention may be readily designed to provide a desired IR signature for a predetermined period of time, based on selection of silane storage capacity, geometric ratio (size vs. lifetime considerations), type and characteristics of the separator/restrictor element, combustion rate of the silane/oxygen reaction, and consequent thermal increase, the nature of the container material of construction, and the fill pressure for silane gas in the container. Accordingly, such design variables may be empirically selected, and modeled and/or experimentally varied, to determine an IR emitter device that is appropriate for a given application, to provide an IR signal for an extended length of time.

The IR emitter device of the invention may be utilized for a wide variety of end uses, including, without limitation, surveying, mapping, geographic marking, target marking, deployment as emergency rescue beacons, tracking of wildlife, orienteering and other recreational uses, etc., in connection with IR detectors and sensors of various suitable types.

The carbon adsorbent utilized in the IR emitter device, as well as in other embodiments of the present invention, can be of any suitable type, and may for example include carbon nanotubes in a supported or consolidated state, such as the aerogel monolith having carbon nanotubes grown within it, as described in U.S. Pat. No. 6,906,003 issued Jun. 14, 2005 to Struthers et al., or the nanoporous structures formed using nanofibers and "gluing" agents described in U.S. Pat. No. 6,432,866 issued Aug. 13, 2002 to Tennent et al., the disclosures of which hereby are incorporated herein by reference in their respective entireties.

The invention in another aspect takes advantage of the electrical properties of carbon as a conductor having significant resistivity, which enables carbon adsorbent to be electrically energized to effect resistive and/or inductive heating for desorption of residual adsorbed fluid. By inputting electrical energy to the carbon adsorbent, heels fluid can be removed from the carbon adsorbent, to achieve higher fluid utilization than heretofore has been possible in low pressure carbon adsorbent-based fluid storage and dispensing operations, without external heating of vessels in which the carbon adsorbent is contained.

The invention in one embodiment relates to a fluid storage and dispensing apparatus, comprising a fluid storage and dispensing vessel holding carbon adsorbent, a dispensing assembly for dispensing of fluid from the vessel under dispensing conditions, and an electrical power assembly adapted to input electrical energy to the carbon adsorbent for resistive and/or inductive heating thereof to effect desorption of fluid from the carbon adsorbent.

The electrical power assembly can be configured in any suitable manner. In one embodiment, the electrical power assembly includes at least one electrode adapted to transmit electrical energy to the carbon adsorbent, e.g., an electrode arranged in contact with carbon adsorbent articles. The carbon adsorbent articles can be provided in a stacked array in a vessel, and the electrical power assembly can include an electrical transmission wire coupled with the vessel, when the vessel includes a conductive material of construction. The conductive material can be a metal, such as steel, ferrous alloys, aluminum, titanium, etc. The fluid storage and dispensing system can also be configured to include multiple electrodes in contact with the carbon adsorbent.

In one embodiment, the carbon adsorbent may be provided in an extended length conformation, as hereinafter more fully described. For example, the extended length conformation may include a helical conformation carbon adsorbent that is coupled at respective ends thereof with the electrical power assembly.

The electrical power assembly can include a power supply of any suitable type, including radio frequency power supplies, DC power supplies, AC power supplies, etc. The carbon adsorbent can be coupled with the power supply by electrical power supply wires, and the power supply can be arranged to be detachably coupled to the carbon adsorbent.

In one embodiment, the electrical power assembly includes a Wheatstone bridge circuit in which the carbon adsorbent is a resistive element of the circuit.

In various other embodiments, the carbon adsorbent is inductively resistively heated, such as by use of a coil arranged to non-contacting surround at least a portion of a fluid storage and dispensing vessel containing the carbon adsorbent. In one such embodiment, the fluid storage and dispensing vessel contains a first transformer winding adapted to input to electrical energy to the carbon adsorbent for induction of eddy currents therein. Inductively coupled with the first transformer winding in the vessel is a second transformer winding exterior of the vessel. Second transformer winding is suitably coupled to an alternating current power supply, by wires constituting a circuit arrangement with the second transformer winding.

In another embodiment, the electrical power assembly includes an electrode disposed in the fluid storage and dispensing vessel and extending exteriorly thereof, and then the electrical connection in contact with the vessel, with the vessel comprising a metal material of construction. In such embodiment, the electrical connection and exterior portion of the electrode are coupled with a power supply. The power supply is adapted to be selectively actuated at the end of the dispensing operation, when fluid inventory in the vessel has declined to a predetermined low level, so that electrical energy is transmitted to the carbon adsorbent for heating thereof, to drive off the residual fluid from the adsorbent.

The invention correspondingly contemplates a method of dispensing fluid from a carbon adsorbent involving desorption of fluid therefrom, which includes inputting electrical energy to said carbon adsorbent to effect resistive and/or inductive heating thereof. The adsorbent in such method can be contained in a vessel adapted to selectively dispense fluid under dispensing conditions. The inputting of electrical energy to the carbon adsorbent can be carried out in apparatus arrangements of the type described above, e.g., involving inputting electrical energy to effect resistive heating by at least one electrode in contact with the carbon adsorbent.

The inputting of electrical energy to the carbon adsorbent to effect the resistive and/or inductive heating thereof can be controllably modulated to effect desorption of residual fluid from the carbon adsorbent, as appropriate to achieve a predetermined extent of fluid utilization. The modulation may be carried out in response to monitoring of a condition of the carbon adsorbent or fluid desorbed therefrom, such as temperature of the carbon adsorbent, desorbed fluid pressure, etc.

The aforementioned method may involve inductive heating in which eddy currents are induced in the carbon adsorbent from a first transformer winding that is inductively coupled with a second transformer winding coupled with an alternating current power supply, such as a radio frequency AC power supply. Alternatively, the input of electrical energy can include passage of alternating current through a coil surrounding the carbon adsorbent, e.g., wherein the carbon adsorbent is contained in a vessel positioned within said coil.

As indicated, the inputting of electrical energy may involve resistive heating of the carbon adsorbent, wherein the carbon adsorbent comprises a resistance of a Wheatstone Bridge assembly.

The invention in another method aspect relates to a method of reducing heels of adsorbed fluid in a vessel containing carbon adsorbent having such fluid adsorbed thereon, in which the method includes inputting electrical energy to the carbon adsorbent for resistive heating and/or inductive heating of the carbon adsorbent to effect desorption of heels fluid therefrom. The desorb heels fluid then can be used in a fluid-utilizing process, such as a microelectronic device manufacturing process, e.g., involving ion implantation.

The carbon adsorbent used in the practice of the present invention for heels fluid recovery can be of any suitable type, including activated carbon, carbon impregnated with metal particles, fibers, etc., or any other form of or composition of carbon adsorbent that is responsive to input of electrical energy to become heated and thereby release an increased amount of an adsorbed fluid therefrom, in relation to a corresponding carbon adsorbent that is not heated by input of electrical energy.

The invention in another aspect contemplates a method of fluid delivery, including providing fluid in an absorbed state on activated carbon; selectively dispensing fluid from the activated carbon; and when a predetermined residual amount of fluid remains adsorbed on the carbon adsorbent, electrically heating the adsorbent to effect removal of the residual fluid, by resistive heating and/or inductive heating of the carbon adsorbent. In a specific embodiment, the carbon adsorbent is contained in a fluid storage and dispensing vessel, and the removed residual fluid is used to manufacture a microelectronic device.

The invention also contemplates a semiconductor manufacturing facility comprising a fluid storage and dispensing system as previously described. The semiconductor manufacturing facility may for example include an ion implanter arranged to receive fluid desorbed from the carbon adsorbent. More generally, a fluid-utilizing process system can be provided, comprising a fluid source and dispensing system as previously described and a fluid-utilizing apparatus adapted to receive fluid desorbed from the carbon adsorbent.

The carbon adsorbent can be utilized to store and selectively dispense any suitable fluid for which the carbon adsorbent has appropriate sorptive affinity. The fluid can for example comprise a microelectronic device manufacturing fluid, such as a deposition reagent, etchant, cleaning fluid, polishing reagent, photoresist, etc. Specific fluids that may be stored on and dispensed from the carbon adsorbent include, without limitation, arsine, phosphine, ammonia, boron trifluoride, boron trichloride, diborane, organometallic species, nitrogen trifluoride, and hydrogen chloride.

Figure 8:
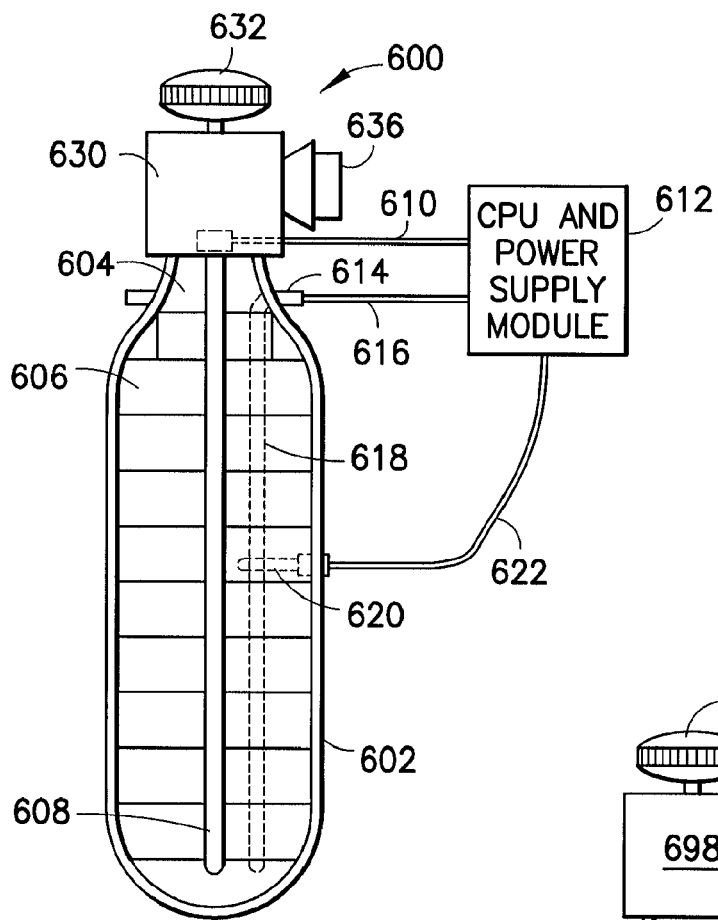
FIG. 8 is a schematic representation of a fluid storage and dispensing system, according to yet another embodiment of the invention.

Referring now to the drawings, FIG. 8 is a schematic representation of a fluid storage and dispensing system 600, according to one embodiment of the invention.

As illustrated, the storage and dispensing system 600 includes a vessel 602 defining an interior volume 604 therein. In the interior volume 604 is disposed a stack 606 of monolithic carbon adsorbent articles, which are generally coextensive in diameter with the vessel, so that the carbon adsorbent articles are in contact with the interior surface of the vessel wall.

The carbon adsorbent articles in the stack 606 are of generally cylindrical form, being stacked in face-to-face contact, to extend in the vertical direction from a lower portion of the vessel to an upper portion thereof. The adsorbent articles have sorptive affinity for a fluid of interest, e.g., a gas or liquid. Such fluid may for example comprise a semiconductor manufacturing chemical reagent, such as arsine, phosphine, ammonia, boron trifluoride, boron trichloride, diborane, organometallic species, nitrogen trifluoride, hydrogen chloride, etc.

The vessel 602 can be formed of steel or other ferrous alloy or other metal such as aluminum, titanium, etc. The vessel at its upper end is joined to a valve head assembly 630, having a valve passage therein containing a valve element that is translatable between a fully open and a fully closed position, by rotation of the handwheel 632. The valve head assembly 630 includes a discharge port 636, to which may be joined a dispensing line or other coupling, instrumentation or flow circuitry.

In this embodiment, electrode 608 is mounted centrally in the interior volume 604 of the vessel 602, extending downwardly through central openings in the carbon adsorbent articles in the stack 606. The upper end of the electrode is mounted in an insulated bushing in the valve head, being connected to the central processing unit and power supply module 612, by power supply line 610. The central processing unit and power supply module 612 also is connected by a second power supply line 616 to a contact collar 614 mounted in electrical contact with the exterior surface of the vessel 602, as shown.

By the arrangement shown in FIG. 8, the fluid sorptively retained on the carbon adsorbent articles in the stack 606 is desorbed from the adsorbent under dispensing conditions, and discharged after flow through the valve head 630 to discharge port 636. After a sustained period in operation, the amount of the fluid held on the carbon adsorbent declines to a low level, at which it is difficult to effect desorption and continued discharge of fluid from the vessel.

At that point, the CPU and power supply module 612 is actuated, for example by a pressure transducer (not shown in FIG. 8) in the flow circuitry downstream from the vessel, or other process monitoring system, and delivers electrical energy to the electrode 608 and the contact collar 614. By this action, current flows through the electrode 608 and the conductive carbon adsorbent to the vessel wall, to complete the circuit with the power supply lines 610 and 616.

The carbon adsorbent in the stack 606 is thereby electrically resistively heated, to produce elevated temperature in the adsorbent, effecting desorption of the fluid from the carbon adsorbent and discharge of the desorbed fluid from the vessel through discharge port 636.

In this arrangement, the enclosing wall of the vessel 60 acts as a second electrode and the carbon adsorbent acts in the manner of an electrolyte medium having sufficient resistivity to effect heating of the adsorbent and thereby drive off residual fluid from the adsorbent. This arrangement thereby enables a very high utilization of the adsorbed fluid to be achieved, with percentage dispensed fluid values (i.e., the percent of originally charged fluid in the vessel that is subsequently dispensed from the vessel) approaching 100%.

Temperature sensing of the resistively heated adsorbent material can be conducted, and the extent of electrical energy input modulated in response to the sensed temperature, to achieve a necessary or desired level of desorption of the fluid. In other embodiments, various other sensors and sensing arrangements can be employed to monitor the electrical energy input to the carbon adsorbent, and to generate sensing/monitoring signals that can be employed to control the input and duration of electrical energy to the adsorbent.

In the specific arrangement shown in FIG. 8, a thermocouple 620 is positioned in the stack 606 of adsorbent articles, to monitor the stack temperature. The thermocouple generates a temperature sensing signal that is transmitted in temperature signal transmission line 622 to the CPU and power supply module 612. The CPU and power supply module 612 in response modulates the power transmitted to the adsorbent stack, to achieve a predetermined temperature and desorption of fluid from the adsorbent material.

As another variation of the specific embodiment shown in FIG. 8, a second electrode 618 can be deployed in the interior volume 604 of vessel 602, extending through the stack of adsorbent articles, and joined at an upper end thereof to the power supply line 616. The power supply line 616 in such variation extends through the wall of the vessel, e.g., by an insulated collar positioned in the wall of the vessel through which the power supply line 616 passes to connect with the second electrode. In such variation, the contact collar 614 optionally may be employed, or alternatively absent from the arrangement.

The fluid storage and dispensing system shown in FIG. 8 enables resistive heating of the carbon adsorbent medium, to effect a high level of utilization of the sorbate fluid initially charged to the vessel. It will be recognized that the supply of electrical power to the adsorbent may be effected in a wide variety of alternative ways, and that such power may be modulated during the resistive heating phase of operation in any suitable manner, to achieve the desired level of desorption of fluid from the sorbent medium in the vessel.

Figure 9:
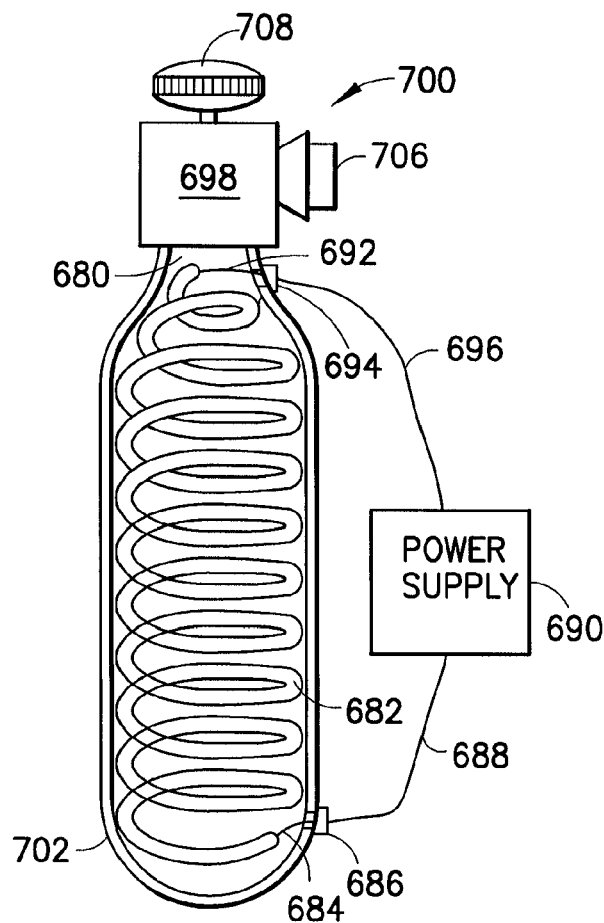
FIG. 9 is a schematic representation of a fluid storage and dispensing system, according to a further embodiment of the invention.

FIG. 9 is a schematic representation of a fluid storage and dispensing system 700, according to a further embodiment of the invention.

The fluid storage and dispensing system 700 includes a vessel 702 enclosing an interior volume 680 in which is disposed a helically shaped adsorbent body 682 formed of carbon, e.g., activated carbon. The carbon body 682 is joined at an upper end thereof to electrical supply wire 692 which passes through insulated bushing 694 and is coupled to electrical feed line 696. The electrical feed line 696 is in turn connected to power supply 690.

At its lower end, the carbon body 682 is joined to electrical supply wire 684 which passes through insulated bushing 686 and is coupled to electrical feed line 688, connected in turn to power supply 690.

The bushings 686 and 694 are mounted on the vessel in association with respective openings in the vessel wall. At its upper end, the vessel 702 is joined to valve head assembly 698, including a discharge port 706 and a handwheel 708 arranged for manual opening or closure of the valve in the valve head 698. In lieu of such handwheel, an automatic valve actuator can be employed.

By the arrangement shown in FIG. 9, the adsorbent body 682 can be selectively heated by action of the power supply 690 delivering electrical energy in feed lines 696 and 688 to electrical supply wires 692 and 684, respectively. Since the adsorbent body has a length that is substantially greater than the height of the vessel 702, current flowing into the adsorbent body at one end and passing to the other end of such body travels a distance much greater than the linear distance from the lower portion to the upper portion of the vessel. This "extended length" conformation of the adsorbent body increases the resistivity significantly, over a linear conformation of the adsorbent body, so that less current is required to heat the carbon body than in a linear conformation.

In lieu of the helical conformation of the adsorbent body shown in FIG. 9, the adsorbent body can be in any other suitable "extended length" conformation, to provide a tortuous or elongated path for current flow through the body. As used herein, the term "extended length conformation" refers to a physical form of the adsorbent body in which the current path for electrical energy through the body is substantially greater than the linear extent, e.g., length dimension, of the body. The carbon adsorbent body may therefore have a pleated, zigzag, spiral, wool or porous matrix form, or any other suitable physical or morphological form that provides the extended length conformation.

Figure 10:
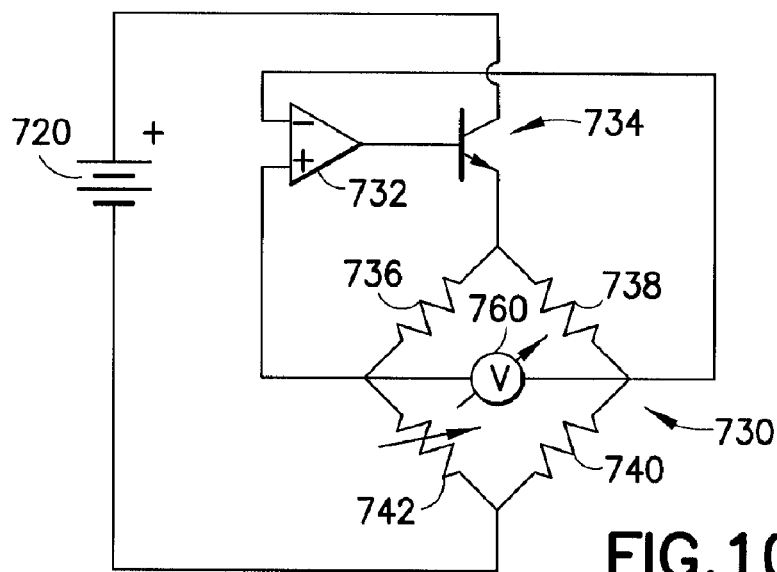
FIG. 10 is a schematic representation of a Wheatstone Bridge circuit in which one of the resistive elements is constituted by a carbon adsorbent bed.

FIG. 10 is a schematic representation of a Wheatstone Bridge circuit in which one of the resistive elements is constituted by a carbon adsorbent bed, according to another embodiment of the invention.

The bridge circuit includes a power supply 720 connected as shown to the Wheatstone Bridge 730 including fixed resistors 736, 738 and 740 and variable resistor 742. Between the resistor legs of the bridge is disposed a voltage detector 760. The voltage detector 760 is joined in series with an operational amplifier 732, to provide inputs to the amplifier as shown. The amplifier output is coupled with NPN transistor 734, to transmit the output to the gate structure of the transistor. The source and drain of the transistor are coupled with the power supply 720 and Wheatstone Bridge 730, respectively.

The Wheatstone Bridge circuit of FIG. 10 is constituted with one of the fixed resistors being the resistance of the carbon adsorbent in a fluid storage and dispensing system of a type as previously described. By this arrangement, the Wheatstone Bridge can be balanced by the variable resistance of the variable resistor 742 to achieve zero current flow through the carbon adsorbent during normal dispensing operation or when the system is in a non-dispensing state.

When dispensing operation has continued for sufficient duration to reduce the inventory of the fluid in the system to a low level at which dispensing becomes disproportionately more difficult, the resistance of the variable resistor 742 can be adjusted to unbalance the Wheatstone Bridge, and cause current to flow to the carbon adsorbent for electrical resistance heating thereof. In such manner, the carbon adsorbent can be used as a temperature sensing element, thereby self-regulating at a desired temperature. Alternatively, a simple current limit device could be implemented, or alternatively, an embedded temperature sensor could be employed, in the manner of the arrangement shown in FIG. 8.

Figure 11:
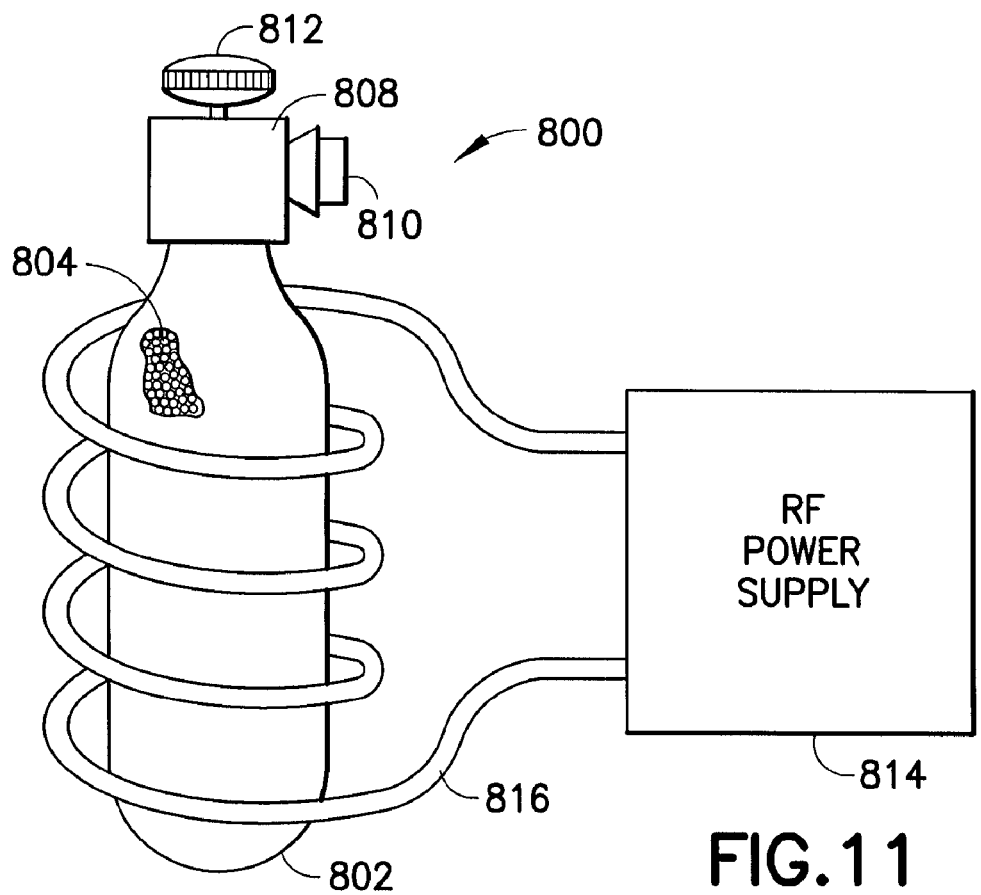
FIG. 11 is a schematic representation of a fluid storage and dispensing system according to another embodiment of the invention.

FIG. 11 is a schematic representation of a fluid storage and dispensing system 800 according to another embodiment of the invention.

In the FIG. 11 arrangement, a vessel holding in its interior volume a bed of carbon adsorbent 804 is joined to a valve head assembly 808, including a fluid discharge port 810 and a handwheel 812 for manual opening or closing of the valve in the valve head assembly. In lieu of a manual handwheel, the valve in the valve head assembly 808 may be connected to a valve actuator, e.g., a pneumatic, electrical, or other actuator, which is operatively arranged to open or close the valve in the valve head assembly.

The FIG. 11 arrangement includes an RF power supply 814, operatively coupled with an induction coil 816, with the induction coil being appropriately sized to permit the vessel 802 to reside within the loops of the coil.

In use, fluid is dispensed from the vessel 802 under dispensing conditions, which may include a reduced pressure in a fluid-utilizing tool or downstream portion of the flow circuitry resulting in pressure gradient-induced desorption, or passage of a carrier gas through the interior volume of the vessel 802, to create a mass transfer gradient effecting desorption from the adsorbent and entrainment in the carrier gas being flowed through the vessel, or in other manner effecting release of fluid from the adsorbent.

When the inventory of fluid in the vessel has been sufficiently depleted, the RF power supply 814 is activated, to send alternating current through the coil 816, thereby generating a magnetic field producing eddy currents in the carbon adsorbent. As a result, heat is produced in the adsorbent, to produce an enhanced desorption of fluid from the adsorbent, relative to a corresponding adsorbent in which no such inductive heating takes place.

The inductive heating described with reference to the FIG. 11 arrangement effects removal of residual fluid from the vessel 802 in a simple and non-invasive manner, so that substantially complete dispensing of the fluid from the vessel is achieved.

It will be appreciated that the frequency of the alternating current provided by the RF power supply 814 in the FIG. 11 system can be selected to achieve optimum coupling efficiency in effecting desorption of residual fluid from the adsorbent material in container 802.

The FIG. 11 system can employ a control scheme of any suitable type, to modulate the RF power supply 814 in providing alternating current to the induction coil 816. For example, pressure of the dispensed gas can be monitored, and a suitable feedback control assembly can be employed to maintain a fixed operating pressure of the dispensed gas.

More generally, the fluid storage and dispensing systems of FIGS. 8, 9 and 11 can employ a wide variety of monitoring and feedback control components and sub-systems to ensure that the residual fluid in the vessel at the final stage of dispensing operation (as the vessel is approaching exhaustion) is extracted, to minimize the heels in the vessel.

Such monitoring and control apparatus can include power monitoring of the electrical power input to the carbon adsorbent, thermal monitoring of the adsorbent during such power input, pressure monitoring of the dispensed gas, flow monitoring of the dispensed fluid, use of blending systems (e.g., for combining the fluid from a vessel approaching exhaustion that is being submitted to electrical power inputting for resistive and/or inductive heating of the adsorbent therein, and fluid from a second fresh vessel containing a full or substantial charge of fluid), etc.

Figure 12:
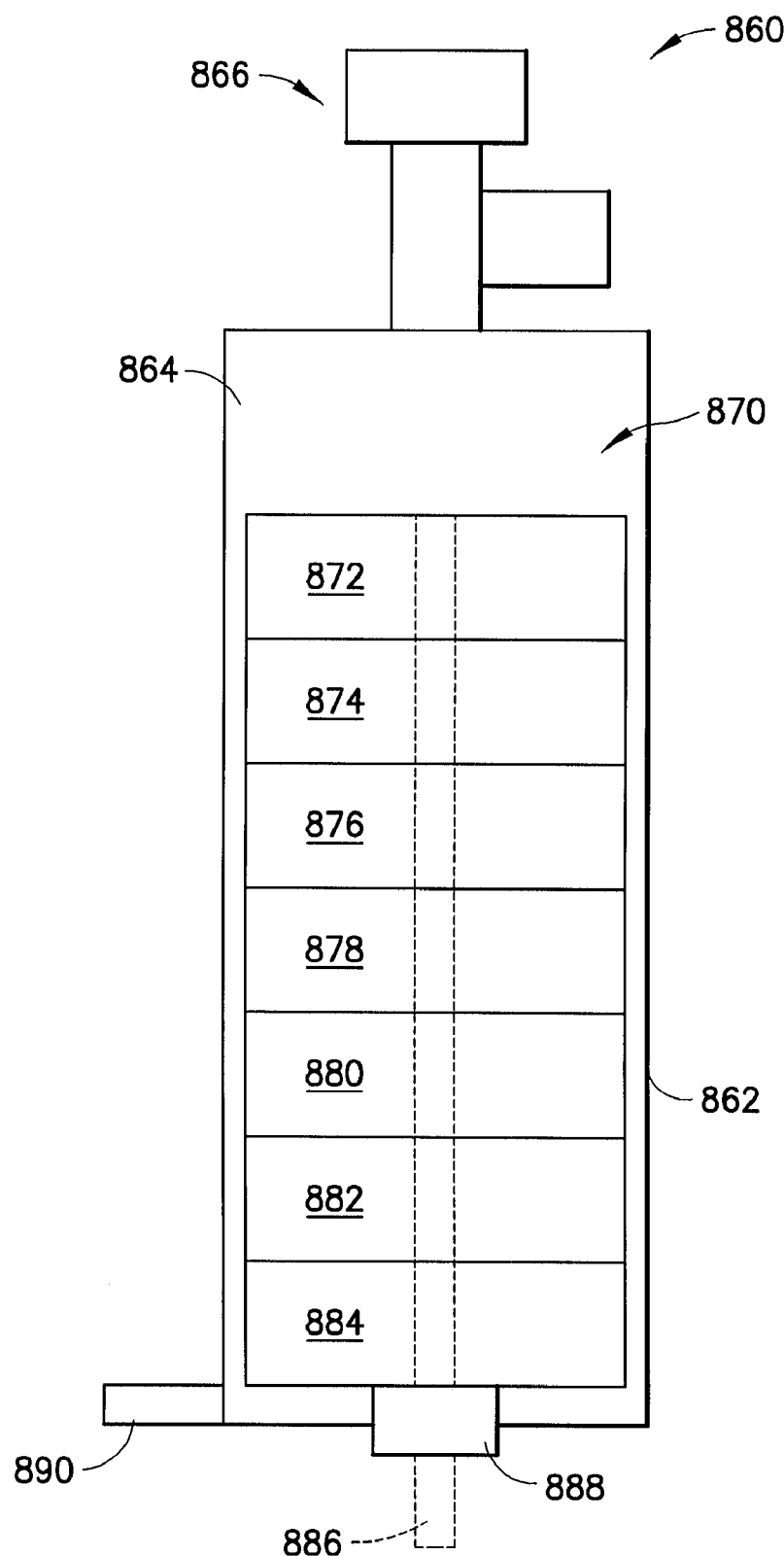
FIG. 12 is a schematic cross-section elevation view of a fluid storage and dispensing system, according to a further embodiment of the invention.

FIG. 12 is a schematic cross-sectional elevation view of a fluid storage and dispensing system 860 according to a further embodiment of the invention.

The fluid storage and dispensing system 860 includes a vessel 862 joined to a fluid dispensing assembly 866 at its upper end. The vessel 862 encloses an interior volume 864, in which is disposed a vertical stack 870 of carbon adsorbent discs 872, 874, 876, 878, 880, 882 and 884, as illustrated.

The stack 870 of carbon adsorbent articles is arranged with an electrode 886 extending through a glass or ceramic seal 888 upwardly into the interior volume 864, through central openings in each of the carbon adsorbent particles 872, 874, 876, 878, 880, 882 and 884.

The vessel 862 is provided with an electrical connection 890, in contact with the metal wall of the vessel 862, such wall being formed of steel, aluminum, or other conductive material. The electrical connection 890 may be integrally formed on the vessel, or such connection may be coupled with the vessel in any suitable manner, such as by provision on the exterior surface of the vessel of a coupling structure or a fitting for such purpose.

The electrode 886 and connection 890 are coupled with a suitable power supply (not shown) in a circuit arrangement, whereby electrical energy is inputted into the stack 870, to effect resistive heating thereof.

Figure 13:
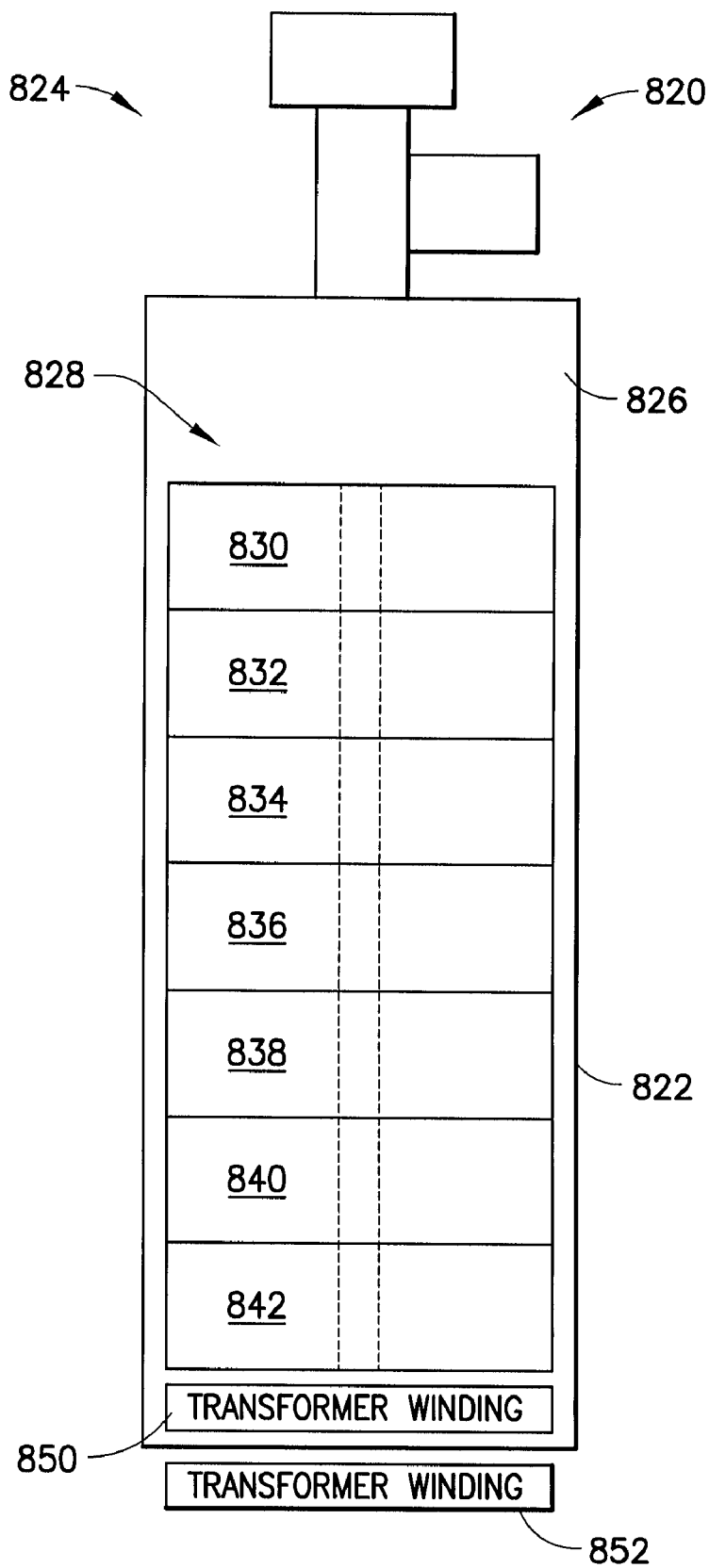
FIG. 13 is a schematic cross-sectional elevation view of a fluid storage and dispensing system, in accordance with another embodiment of the invention.

FIG. 13 is a schematic elevation view, in cross-section, of a fluid storage and dispensing system 820, according to a further embodiment of the invention.

The fluid storage and dispensing system 820 includes a vessel 822 defining an enclosed interior volume 826 in which is disposed a stack 828 of adsorbent articles 830, 832, 834, 836, 838, 840 and 842.

The vessel 822 in this embodiment contains a transformer winding 850 in the lower portion of the vessel, beneath the stack 828 of carbon adsorbent articles.

The vessel is positioned above a second transformer winding 852, for inductive coupling of the respective transformer windings 850 and 852.

The vessel 822 is joined at its upper end to a dispensing assembly 824, which may include a valve structure and dispensing port, for egress of desorbed fluid from the vessel, under dispensing conditions, e.g., when the valve is open to flow, and a pressure differential, mass transfer gradient, or other transport condition causes efflux of fluid from the vessel to a downstream flow circuitry, process tool, or other end use location for the dispensed fluid.

The transformer winding 850 and 852 as indicated above are inductively coupled with one another, and the exterior transformer winding 852 is suitably coupled with a power supply (not shown) in circuit relationship therewith, so that the energization of transformer winding 852 correspondingly energizes transformer winding 850 and produces a field in the interior volume 828 of vessel 822, thereby electrically energizing and resistively heating the carbon adsorbent articles in the stack 828.

By this arrangement, the resistive heating is carried out in a non-invasive manner as regards the vessel 822. By avoiding the need for any openings in the vessel, other than that associated with the dispensing assembly 824, a vessel can be provided of a highly reliable character, having only a single seam at the juncture of the dispensing assembly and the top of the vessel.

The invention thus contemplates a wide variety of specific arrangements and embodiments for inputting of electrical energy to a carbon adsorbent for removal of heels fluid therefrom, which may be correspondingly embodied and implemented to achieve high fluid utilization in the use of carbon adsorbent-based fluid storage and dispensing systems for low pressure dispensing of fluid.

In another aspect, the invention contemplates a method of increasing fill capacity of a nanoporous carbon adsorbent, e.g., in the form of porous carbon discs in a stacked array, such as are disposed in a fluid storage and dispensing package including a vessel containing such fluid, in which the stored fluid comprises a small molecule fluid species. The fill capacity of the porous carbon adsorbent is the amount of adsorbate that can be taken up by the adsorbent, i.e., the loading of the adsorbate species on the adsorbent.

In this aspect of increasing the loading capacity of the porous carbon adsorbent, the adsorbent is contacted with a swelling agent, followed by contacting of the carbon adsorbent with a pressurized gaseous penetration agent, followed by removal of the swelling agent and penetration agent, e.g., by vacuum extraction and heating of the porous carbon to volatilize any residual swelling agent and penetration agent therein.

As used herein, the term "swelling agent" refers to an agent that in contact with the microstructure of the porous carbon material effects an expansion of the porosity and void structure of such material. The swelling agent may be of any suitable type, and may for example include agents such as water, ethers, alcohols or other organic or inorganic solvent media that effects such expansion of the porous carbon.

The term "penetration agent" as used herein refers to an agent that (1) in a pressurized form is contacted with the porous carbon material containing the swelling agent to effect transport of the swelling agent into the porosity and void structure for enhancement of the loading capacity of the porous carbon material upon its being subsequently contacted by an adsorbate and (2) is compatible with the swelling agent to permit the swelling agent and penetration agent to be volatilized and removed from the porosity and void structure without loss of the swelling effect of the swelling agent on such porosity and void structure. The penetration agent may be of any suitable type, and may for example include inert gases such as helium, argon, krypton, neon, etc.

In the one preferred embodiment, the swelling agent comprises water vapor, and the penetration agent comprises helium.

In the removal of the residual swelling agent and penetration agent from the porosity and void structure of the porous carbon, after swelling has been effected, it is important that the removal not involve heating to temperatures of 350° C. or higher, since temperatures of 350° C. or higher result in loss of the increased loading capability that is otherwise obtained when the removal of the swelling agent and penetration agent is effected at temperatures below 350° C.

In such aspect of the invention, the carbon adsorbent is pretreated by exposure to water vapor so that the carbon adsorbent takes up the water vapor. This water vapor exposure is followed by contact with helium (or other inert gas, e.g. argon, krypton, nitrogen, xenon) at elevated pressure, such as pressure in a range of from 100 to 500 psi. The helium is then removed from the carbon adsorbent under vacuum, followed by a bake-out at elevated temperature, e.g., temperature in a range of from 100° C. to 300° C. This yields a pretreated carbon adsorbent having enhanced adsorptive capacity for the small molecule fluid species.

Such pretreatment method can be advantageously employed for any of a variety of fluid species, and is most beneficially applied for enhancing activated carbon, e.g., in the form of beads, granules, tablets, pellets, powders, extrudates, particulates, cloth or web form articles, monolithic forms, composites of the porous carbon with other materials, comminuted forms of the foregoing, and crushed forms of the foregoing, for storage and dispensing of a gas whose molecules have a relatively flat steric molecular conformation, as opposed to a spherical conformation. In one embodiment, the fluid species comprises a halide gas. Examples of illustrative halide gases include boron trifluoride, diborane, boron trichloride, phosphorus trifluoride, arsenic pentafluoride, silicon tetrachloride, germanium tetrafluoride. Boron trifluoride is a particularly useful gas for storage on and dispensing from carbon adsorbent that has been treated by such methodology.

By way of specific example, the carbon adsorbent pretreatment method of the invention has been demonstrated to increase the capacity of the carbon adsorbent for boron trifluoride by levels of 35-50% in relation to corresponding carbon adsorbent that has not been pretreated in such manner. It will be recognized that the specific process conditions for the pretreatment method of the invention can be readily experimentally determined for a given fluid species, by the simple expedient of varying the process conditions for the adsorbate gas of interest, and measuring the loading of adsorbate fluid species that is achievable on the adsorbent, to determine the adsorbent capacity for such fluid species.

The invention correspondingly contemplates a fluid storage and dispensing apparatus comprising a vessel containing carbon adsorbent that has been pretreated by the aforementioned pretreatment method of the invention, prior to the vessel being charged with fluid to be adsorbed on and subsequently dispensed from the adsorbent in the vessel.

The features and advantages of the carbon adsorbent pretreatment method of the invention are more fully shown by the following examples. Such examples are intended to be illustrative of the practice of the carbon pretreatment method in specific embodiments, and are not intended to be limitingly construed, as regards the general character and applicability of the carbon pretreatment method of the invention.

Example 1

In a standard fill procedure for boron trifluoride gas storage and dispensing packages, a cylindrical gas vessel is filled with a stack of activated carbon pucks, and a headpiece is welded to the gas cylinder. The cylinder fabrication then is completed by installation of a valve head assembly on the headpiece.

The resulting gas supply package with the valve in the valve assembly in an open position, is charged with helium gas at 300 psi pressure through the valve head assembly, and the valve then is closed. The helium-containing package next is placed in a vacuum chamber. The vacuum chamber is subjected to high vacuum, with a helium gas detector monitoring any leakage of the helium that may occur from the vessel.

If the vessel by such testing is determined to be leak-tight in character, then the helium is removed from the vessel by applying a high vacuum to the system, followed by a bake-out at elevated temperature. This procedure drives off residual volatile components and contaminants from the adsorbent. After cooling to ambient temperature, the vessel is charged with the boron trifluoride gas. Once charged, the vessel is sealed by closure of a fill port or a valve in the valve head assembly, with the adsorbed boron trifluoride gas stored on the carbon adsorbent. Such stored boron trifluoride gas can thereafter be desorbed from the carbon adsorbent under dispensing conditions, such as may include a pressure differential between the interior volume of the vessel and a downstream dispensing location exterior of the vessel, and/or heating of the vessel to effect desorption of the boron trifluoride from the carbon adsorbent, and/or flowing of a carrier gas through the interior volume of the vessel to create a concentration gradient for effecting a desorption of the boron trifluoride gas from the carbon adsorbent.

Example 2

A gas supply package is fabricated as in Example 1, but prior to contacting with helium gas, the carbon adsorbent is exposed to water vapor so that water vapor is taken up by the adsorbent. The amount of water vapor taken up by the adsorbent can be in a range of from 5% to 40% by weight, or more, based on the weight of carbon adsorbent.

The gas supply package then is pressurized with helium at 300 psi, as described in Example 1. The vessel after removal of helium is then subjected to bake-out of the adsorbent, cooling of the vessel to ambient temperature and is then charged with boron trifluoride gas.

Results of Comparative Testing

A comparative test was carried out to determine the efficacy of the pretreatment method of Example 2 over the standard method of Example 1.

Two series of comparative tests were conducted.

In the first series, each of four gas cylinder vessels was loaded with 2550 grams of carbon adsorbent, in the form of a stack of puck articles of such sorbent. The vessels were then charged with helium gas. After removal of helium, the vessel was baked out to remove residual gas and contaminants from the carbon adsorbent and then charged with boron trifluoride gas.

The carbon adsorbent in the first vessel (Sample 1) was not exposed to any water vapor prior to helium charging and bake-out; the bake-out was conducted at 180° C. The carbon adsorbent in the second vessel (Sample 2) was exposed to water vapor resulting in a moisture content of 24.5% by weight on the carbon adsorbent, based on the weight of the carbon adsorbent, and was charged with helium prior to bake-out at 180° C. The carbon adsorbent in the third vessel (Sample 3) was exposed to water vapor resulting in a moisture content of 25.6% by weight on the carbon adsorbent, based on the weight of the carbon adsorbent prior to helium charging and bake-out at 350° C. The carbon adsorbent in the fourth vessel (Sample 4) was exposed to water vapor resulting in a moisture content out of 25.3% by weight on the carbon adsorbent, based on the weight of the carbon adsorbent, prior to helium charging.

After helium charging, subsequent removal of the helium gas and bake-out at 180° C., boron trifluoride was charged to the vessel and the amount of such boron trifluoride gas taken up by the adsorbent was measured.

The results of the first test series are set out in Table 1 below. Samples 2-4 were subjected to moisture exposure prior to helium pressurization and bake-out, and Sample 1 was not exposed to moisture prior to such helium pressurization and bake-out.

TABLE 1

Amount of Boron Trifluoride Taken up by 2550 Grams of Carbon Adsorbent

| Sample No. | Moisture Pretreatment Loading on Adsorbent | Bake-Out Temperature,° C. | Amount of Boron Trifluoride on Carbon Adsorbent, Grams |
|---|---|---|---|
| 1 | None | 180° C. | 601.8 |
| 2 | 24.5% | 180° C. | 841.5 |
| 3 | 25.6% | 350° C. | 573.8 |
| 4 | 25.3% | 180° C. | 785.4 |

The data in Table 1 showed that the standard pretreatment of the carbon adsorbent (Sample 1), without moisture exposure before the helium pressurization and bake-out, produced a boron trifluoride loading on the carbon adsorbent of 23.6% (=601.8 g of boron trifluoride/2550 g of carbon adsorbent).

Sample 2, with moisture pretreatment producing 24.5% moisture loading on the adsorbent, helium pressurization and a bake-out temperature of 180° C., produced a boron trifluoride loading on the carbon adsorbent of 33%.

Sample 3, with moisture pretreatment producing 25.6% moisture loading on the adsorbent, helium pressurization and bake-out temperature of 350° C., produced a boron trifluoride loading on the carbon adsorbent of 22.5%.

Sample 4, with moisture pretreatment producing a 25.3% moisture loading on the adsorbent, helium pressurization and bake-out temperature of 180° C., produced a boron trifluoride loading on the carbon adsorbent of 34%.

In the second test series, all conditions were maintained the same as in the first test series, but the amount of activated carbon adsorbent was 2525 grams instead of 2550 grams.

Data for the second test series are set out in the Table 2 below.

TABLE 2

Amount of Boron Trifluoride Taken up by 2525 Grams of Carbon Adsorbent

| Sample No. | Moisture Pretreatment Loading on Adsorbent | Bake-Out Temperature,° C. | Amount of Boron Trifluoride on Carbon Adsorbent, Grams |
|---|---|---|---|
| 5 | None | 180° C. | 518.6 |
| 6 | 24.5% | 180° C. | 833.3 |
| 7 | 25.6% | 350° C. | 568.1 |
| 8 | 25.3% | 180° C. | 777.7 |

The data in Table 2 showed that the standard pretreatment of the carbon adsorbent (Sample 5), without moisture exposure before the helium pressurization and bake-out, produced a boron trifluoride loading on the carbon adsorbent of 20.5% (=518.6 g of boron trifluoride/2525 g of carbon adsorbent).

Sample 6, with moisture pretreatment producing 24.5% moisture loading on the adsorbent, helium pressurization and a bake-out temperature of 180° C., produced a boron trifluoride loading on the carbon adsorbent of 33%.

Sample 7, with moisture pretreatment producing 25.6% moisture loading on the adsorbent, helium pressurization and bake-out temperature of 350° C., produced a boron trifluoride loading on the carbon adsorbent of 22.4%.

Sample 8, with moisture pretreatment producing a 25.3% moisture loading on the adsorbent, helium pressurization and bake-out temperature of 180° C., produced a boron trifluoride loading on the carbon adsorbent of 30.8%.

Accordingly, the data in Tables 1 and 2 showed that the moisture exposure/helium exposure and bake-out pretreatment method of the invention produced a loading of boron trifluoride that was approximately 50% higher than the boron trifluoride loading achievable with the corresponding pretreatment method of the prior art lacking such moisture exposure.

The present invention in various additional aspects relates to nanoporous carbon materials suitable for tribological and ultra-tough structural materials applications, as well having utility in fluid storage/dispensing applications. The invention also relates to systems and methods utilizing such nanoporous carbon materials.

The invention in one aspect relates to nanoimpregnated carbon composite materials that are impregnated with complimentary materials to yield composites that are useful for a variety of purposes, e.g., as tribological materials of high wear-resistant character, as ballistically tough materials, and as armor and armor-piercing materials.

The impregnant can be of any suitable type, as introduced into the porosity of the carbon material to yield a composite having desired properties for a given use application. For such purpose, the carbon material suitably has a porosity comprising pores that are sufficiently deep and extensive throughout the material to enable impregnation to be effected in a simple and efficient manner. For example, the carbon may have nanoporosity including pores having an average pore diameter of less than 10 nm, it being recognized that the specific pore size, pore size distribution, pore tortuosity, etc., may be varied widely in the general practice of the present invention.

Illustrative techniques that may be employed to impregnate the porosity of the carbon material include, without limitation, solution deposition, vapor deposition, ion implantation, etc.

In one embodiment, the impregnant material includes polymers. As an example of an application of such polymer impregnation, a nanoporous carbon material may be impregnated with a polymer such as high molecular weight silicone or polyethylene glycol to produce a super-tough ballistic armor. In the use of such impregnated material, increasing impact of the material will result in the polymer forming long-range linkages between graphitic plates, so that a high degree of fracture toughness is achieved.

Alternatively, polymeric fibers such as long chain aramid fibers, or fibers commercially available under the trademarks Kevlar, PBO, Zorlon and Spectra can be employed as the impregnant. The objective in such impregnation is to attain polymeric penetration of the nanopores to provide multiple anchor points and a three-dimensional array of high-strength fibers, yielding a high fracture toughness material. Such impregnated materials afford the advantages of decreased weight, increased strength, and the ability to form molded structures in a green state that permits uniquely shaped ballistically tough materials to be obtained.

In another embodiment, the impregnant material is selected from among hard materials, the term "hard" denoting materials that have intrinsic hardness and toughness characteristics that distinguish them from "soft" materials such as the polymers and fibers described above.

The impregnant in such applications can be a precursor material that reacts in situ with the carbon to form carbides and/or other reaction products providing the desired properties. As an example, tungsten can be impregnated into nanoporosity of the carbon material by suitable vapor phase deposition techniques, such as by volatilization of an organo-tungsten precursor so that tungsten vapor permeates the pores of the carbon material, and is converted during the deposition and/or by subsequent heat treating of the material to tungsten carbide.

Tungsten carbide is a highly dense material, and one of the hardest materials known. Its use has heretofore been limited due to its difficult-to-machine character. Such difficulty can be surmounted by a provision of a shaped porous carbon article of the ultimate desired conformation, which subsequent to formation of tungsten carbide in porosity thereof provides the finished article having the desired dimensions and configuration. The carbon porosity could for example be penetrated using chemical vapor deposition techniques employing tungsten carbonyl or tungsten hexafluoride to provide tungsten deposits in the pores that then react under elevated temperature conditions to form tungsten carbide in situ.

Such carbon/tungsten carbide composites can be manufactured to provide a replacement material for depleted uranium, e.g., in projectiles for use as armor piercing weapons. Currently, depleted uranium is used for such armor piercing applications, but depleted uranium is a toxic material that is the focus of international efforts to eliminate same from use in weaponry.

More generally, such carbon porosity impregnation can be employed to form structurally graded materials, in which porosity is impregnated to a certain depth or dimension of the porous carbon, or in which diffusional characteristics are employed to provide a concentration gradient of the impregnant over a depth or dimension of the porous carbon material.

Other hard impregnants that may be useful in specific embodiments of the invention include, without limitation, lead, titanium, aluminum, aluminum oxide, silicon, silicon oxide and the like.

The use of an impregnant to at least partially fill porosity of porous carbon material enables the creation of new composite materials, with the ability to create a wide variety of conformations and structural forms in a green state that then can be converted to materials of a desired shape and/or functional character, e.g., ultra-hard and/or densified materials useful in armor piercing bullets and the corresponding dense armor.

In other embodiments of the invention, porous carbon is incorporated with boron to provide a hydrogen storage medium of high hydrogen loading capacity. The boronated porous carbon then can be loaded with hydrogen, so that hydrogen is stored by the porous carbon and released therefrom under dispensing conditions to provide hydrogen, e.g., for a hydrogen fuel cell or other hydrogen-utilizing apparatus or process. In this way, the boron-containing porous carbon provides a hydrogen storage medium having high loading capacity as useful for applications such as hydrogen-powered vehicles.

The boron can be incorporated in the porous carbon material in any suitable manner and by any suitable technique. In one preferred embodiment, boron is at least partially introduced into the porous carbon material by ion implantation, and combinations of ion implantation of boron and vapor deposition or solution deposition techniques can be employed to create boron-containing carbon materials of desired properties.

Another aspect of the invention relates to the use of porous carbon as a chlorine storage medium at subatmospheric storage conditions. Although porous carbon has heretofore been employed as a storage medium for a wide variety of fluids and gases that are adsorbable on such material, chlorine has not been considered for such storage applications, since liquids typically occupy many orders of magnitude less volume than gases, and since chlorine is normally stored and transported in pressurized liquid form.

Such pressurized liquid form of chlorine, however, presents issues of safety and toxicity, particularly when the amount of chlorine involved is large. For example, on Jan. 6, 2005, a Norfolk Southern Corp. freight train carrying chemicals hit a parked train near the Avondale Mills Plant in Graniteville, S.C., USA. The chemicals being transported by the freight train included pressurized liquid-form chlorine. As a result of the collision, toxic chlorine gas was released into the air surrounding the crash site, which caused the deaths of 10 individuals and required the evacuation of 5000 people from nearby residences.

The storage of chlorine in gaseous form as an adsorbate on porous carbon would on initial consideration not appear to be economically viable or practical as a mode of packaging chlorine, but it has surprisingly been found that when comparing the loading capacity of a confined volume holding pressurized liquid chlorine, with the capacity of an equal volume of porous carbon having chlorine gas adsorbed thereon at subatmospheric pressure, the actual capacity of the porous carbon exceeds the capacity of the high-pressure liquid containment volume by approximately 30%.

As applied to the catastrophic release of chlorine at the Graniteville, S.C., USA crash site, the transport of the same amount of chlorine gas (as carried by the Norfolk Southern Corp. freight train) in tube-trailer type rail cars containing porous carbon adsorbent at less than atmospheric pressure, would have resulted in the rate of the release of chlorine being reduced by approximately 1/100,000th compared to the high pressure release that caused the death and damage that occurred.

The surprising capacity improvement in chlorine storage that is achievable by gaseous chlorine storage on porous carbon, as compared to capacity of a corresponding confinement volume of pressurized chlorine liquid, is due to the fact that the confinement volume is limited in the amount of pressurized chlorine liquid that can be stored, since changes in ambient temperature of the confinement volume can cause evaporation, gas expansion and rupture of the containment structure. Accordingly, the confinement volume holding pressurized chlorine liquid must be designed and employed to accommodate increases in temperature of the environment in which the confinement volume resides, as well as evaporation and gas expansion deriving from the liquid chlorine.

In the storage of gaseous chlorine on porous carbon at subatmospheric pressure, however, the chlorine gas is held on the porous carbon adsorbent by physical adsorption forces, enabling the volume containing the porous carbon adsorbent to be much more effectively used at subatmospheric pressure than is achievable by the corresponding volume in which pressurized chlorine liquid is held. As a result, a surprising and unexpected improvement in chlorine storage capacity is achieved, with an accompanying high level of safety improvement, as a result of the subatmospheric gas storage condition of the chlorine gas adsorbed on the porous carbon.

Thus, chlorine gas can be efficiently stored in an adsorbed state at subatmospheric pressure, to obviate the hazards associated with prior art storage and transport of pressurized liquid chlorine, with markedly improved capacity of chlorine per unit of storage volume. At the point of use, the chlorine gas is readily dispensed from the porous carbon adsorbent, by any of suitable thermally-mediated desorption, pressure gradient-mediated desorption, and/or concentration gradient-mediated desorption techniques. For example, a vacuum pump may be employed to effect desorption of chlorine from the porous carbon in the dispensing operation.

In addition to chlorine, such sorbent-based storage and dispensing approach may be applied to ammonia, or to phosgene, or to other industrial gases.

Figure 14:
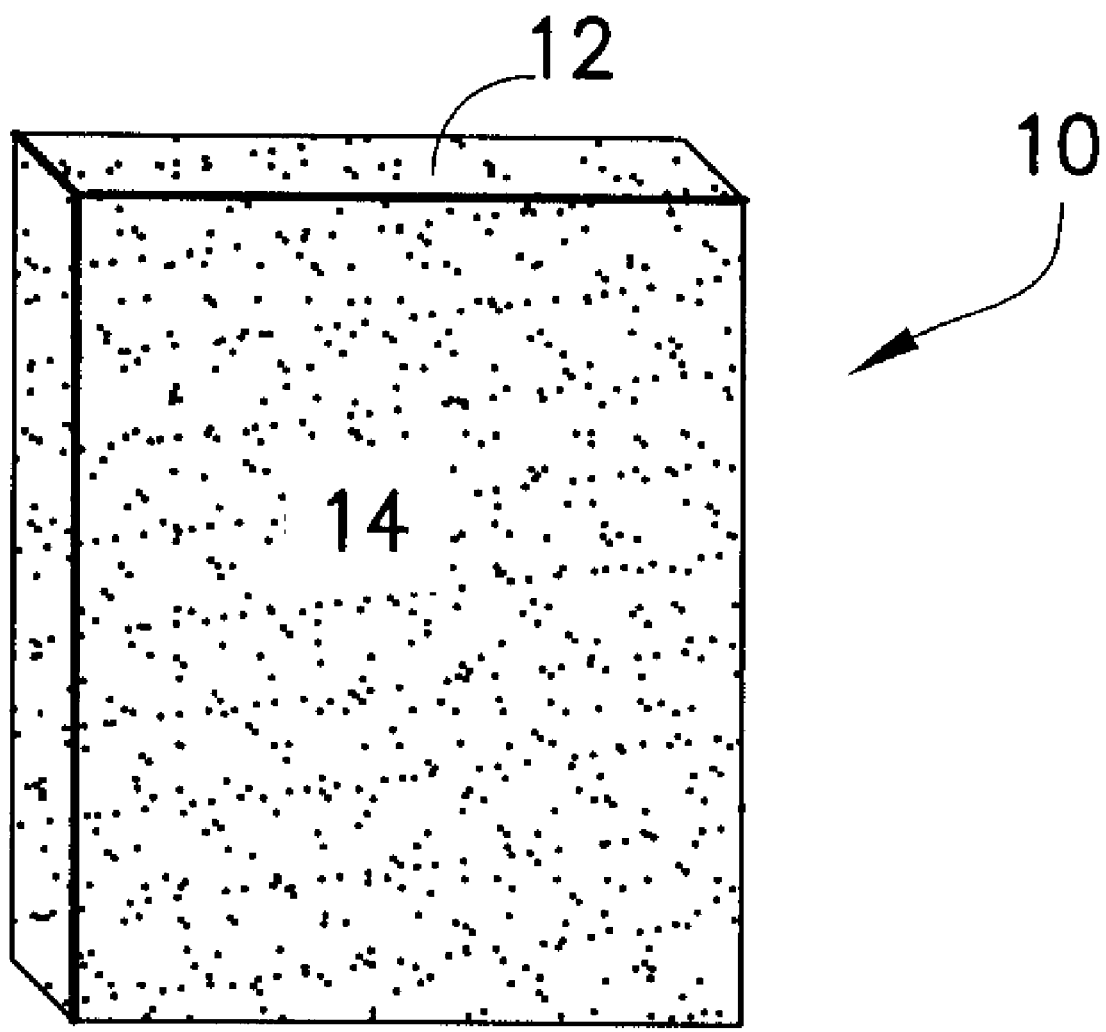
FIG. 14 is a perspective view of an impregnated carbon structural member according to one embodiment of the invention.

Referring now to the drawings, FIG. 14 is a perspective view of an impregnated carbon structural member 10 according to one embodiment of the invention. The impregnated carbon structural member 10 is constituted by a main body portion 12 having a front surface 14 in the view shown.

The impregnated carbon structural member 10 can be a constituent portion of an article of widely varying type. Such member can for example be fabricated from a porous carbon that is impregnated with long chain aramid fibers, or fibers commercially available under the trademarks Kevlar, PBO, Zorlon and Spectra, or with long chain silicone or polyethylene glycol polymers, or with tungsten carbide or other metal carbide. The porous carbon for such application can be formed or provided with porosity of any suitable pore size and pore size distribution, as appropriate to the end use of the structural member.

The structural member itself can be employed for any of a variety of applications, such as ultra-tough composite body armor, vehicular armor, bumper member or impact element, or as a densified material for construction or coating of munitions articles, as a casing material for rugged notebook computers, personal digital assistants, extreme sport watches, and deep sea sensor assemblies, etc.

The impregnant component may be deposited in the porosity of the porous carbon material in any suitable manner, such as vapor deposition (chemical vapor deposition, plasma contacting, etc.), solution deposition, vacuum evacuation and high pressure impregnation of the pores, or any other technique or methodology that is effective to introduce the reinforcement component or a precursor thereof into the porosity of the porous carbon.

Figure 15:
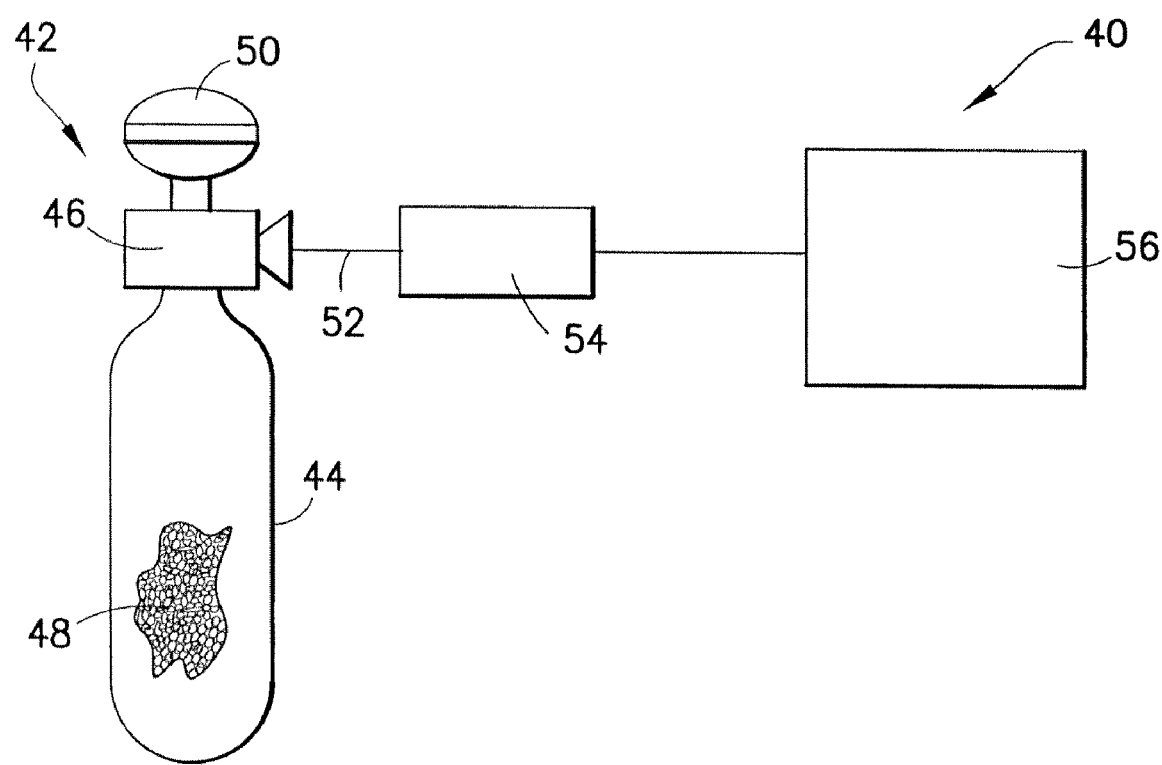
FIG. 15 is a schematic elevation view of a fluid storage and dispensing apparatus according to one embodiment of the invention, as arranged for supplying fluid to a fluid-utilizing facility.

FIG. 15 is a schematic elevation view of a fluid storage and dispensing apparatus 42 according to one embodiment of the invention, as arranged for supplying fluid to a fluid-utilizing facility 56 in a process system 40.

The fluid storage and dispensing apparatus 42 as shown includes a fluid storage and dispensing vessel 44 containing a sorbent medium 48, which may be formed of a porous carbon material, in a discontinuous (e.g., bead or pellet) form, or alternatively in a monolithic bulk form, such as one or more porous carbon sorbent articles, each of which may be in the form of a brick, block, disc, sheet or other conformation for use in storing and dispensing fluids such as gases for fluid-utilizing applications.

The vessel 44 is joined at its upper neck region to a valve head assembly 46 including a flow control valve element (not shown) in the valve body that is translatable between fully open and fully closed positions under the controlling action of the handwheel 50, to effect discharge of the fluid from the vessel 44. By opening the valve, to expose the interior volume of the vessel 44 to the lower pressure in the line 52 coupled to the discharge port of the valve head assembly, fluid adsorbed on the porous carbon sorbent medium in the vessel is caused to desorb and to flow through the valve in the valve head and through the discharge port to the fluid discharge line 52 for dispensing.

The fluid can be dispensed from the vessel 44 in any suitable manner, e.g., in which the dispensing comprises at least one dispensing modality selected from the group consisting of thermally-mediated desorption, pressure gradient-mediated desorption, and concentration gradient-mediated desorption The dispensed fluid in line 52 flows through flow control unit 54 to the fluid-utilizing facility 56. The flow control unit may include any suitable flow control devices or flow modulating elements, such as for example, regulators, mass flow controllers, restricted flow orifices, flow control valves, pumps, compressors, venturis, eductors, flow-smoothing surge vessels, etc. The flow control unit may for example include a vacuum pump for extraction of the fluid from the vessel.

The fluid-utilizing facility 56 may be of any suitable type, as appropriate to the specific fluid that is being delivered. The facility may for example be a manufacturing process facility, a chemical reactor, distribution or blending facility, or the like.

In one embodiment of the invention, the porous carbon 48 in the vessel 44 has boron impregnated in the porosity of the carbon medium, e.g., by ion implantation of boron in the porosity from a precursor such as diborane, borohydride or other boron source material, and functions as a hydrogen gas storage medium. Under dispensing conditions, hydrogen is desorbed from the sorbent medium and flows into the dispensing line 52 to the hydrogen-utilizing facility 56, which may be constituted by a hydrogen fuel cell unit wherein the hydrogen fuel is used to generate a power output, e.g., for vehicular propulsion.

In another embodiment of the invention, the porous carbon 48 in the vessel 44 has chlorine gas adsorbed thereon, for storage of chlorine and selective dispensing thereof from the vessel. The vessel in lieu of the gas supply cylinder shown, may be configured as a tube trailer vessel, or a railcar vessel, for motive transport of chlorine. By such sorptive holding of the chlorine in an adsorbed state on the porous carbon adsorbent medium, the chlorine is maintained in an inherently safer state than high pressure gas vessels of the prior art.

As indicated earlier herein, such sorbent-based storage and dispensing arrangement may be applied to phosgene, ammonia or other industrial gases, to store and transport such gases in an inherently safer form that the high pressure containment structures of the prior art.

While the invention has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed:

1. A gas supply package, comprising a vessel, a valve head assembly coupled to the vessel, and a carbon adsorbent in an interior volume of the vessel, wherein the carbon adsorbent having porosity expanded by contact with a first agent effecting such expansion and a pressurized second agent effecting transport of the first agent into said porosity, wherein the adsorbent subsequent to removal of said first and second agents retains expanded porosity, and wherein the gas supply package is characterized by at least one of the features of:
   (i) the carbon adsorbent being in the form of multiple monolithic adsorbent articles in a stacked arrangement, and the vessel having a positional stabilization structure in the interior volume to retain the monolithic adsorbent articles in position and restrain their movement in relation to one another and in relation to the vessel; and
   (ii) an electrical power assembly arranged to input electrical energy to the carbon adsorbent for resistive and/or inductive heating thereof to effect desorption of fluid from the carbon adsorbent.

2. The gas supply package of claim 1, further comprising a fluid adsorbed on the carbon adsorbent.

3. The gas supply package of claim 2, wherein the fluid comprises a fluid selected from the group consisting of organometallic compounds, hydrides, halides and acid gases.

4. The gas supply package of claim 1, characterized by at least feature (i).

5. The gas supply package of claim 1, characterized by at least feature (ii).

6. The gas supply package of claim 1, characterized by both feature (i) and feature (ii).

7. The gas supply package of claim 4, wherein the positional stabilization structure comprises structure selected from the group consisting of packings, fixture plates, resilient compression elements, screens, bags, adsorbent article configurations, and vessel interior wall conformations.

8. The gas supply package of claim 4, wherein the positional stabilization structure comprises the adsorbent articles being formed to engage one another, to positionally fix them in the stacked arrangement.

9. The gas supply package of claim 4, wherein the positional stabilization structure comprises longitudinal ribs on interior wall surface of the vessel.

10. The gas supply package of claim 2, wherein said fluid comprises a halide fluid.

11. The gas supply package of claim 10, wherein said halide fluid comprises a halide selected from the group consisting of boron trifluoride, diborane, boron trichloride, phosphorus trifluoride, arsenic pentafluoride, silicon tetrachloride, and germanium tetrafluoride.

12. The gas supply package of claim 10, wherein said halide fluid comprises boron trifluoride.

13. The gas supply package of claim 1, wherein the adsorbent has a loading capacity measured for boron trifluoride that is from 35% to 50% higher than loading capacity of a corresponding adsorbent not contacted with said first and second agents.

14. The gas supply package of claim 13, characterized by at least feature (i).

15. The gas supply package of claim 13, characterized by at least feature (ii).

16. The gas supply package of claim 13, characterized by both features (i) and (ii).

* * * * *

UNITED STATES PATENT AND TRADEMARK OFFICE
CERTIFICATE OF CORRECTION

| | | |
|---|---|---|
| PATENT NO. | : 8,221,532 B2 | |
| APPLICATION NO. | : 12/984216 | |
| DATED | : July 17, 2012 | |
| INVENTOR(S) | : J. Donald Carruthers et al. | |

It is certified that error appears in the above-identified patent and that said Letters Patent is hereby corrected as shown below:

Title Page, insert -- (73) Assignee: Advanced Technology Materials, Inc., Danbury, CT --.

Signed and Sealed this
Twenty-fifth Day of September, 2012

David J. Kappos
*Director of the United States Patent and Trademark Office*